United States Patent [19]

Nolan, Jr. et al.

[11] 3,724,783
[45] Apr. 3, 1973

[54] DISCRIMINATORY MISSILE GUIDANCE SYSTEM

[75] Inventors: William J. Nolan, Jr.; Frederick C. Alpers, both of Corona, Calif.

[73] Assignee: The United States of America as represented by the Secretary of the Navy

[22] Filed: July 1, 1952

[21] Appl. No.: 296,773

[52] U.S. Cl. ..........................244/3.15, 343/6, 343/7
[51] Int. Cl. ............F41g 9/00, G01s 7/10, G01s 7/62
[58] Field of Search........................343/5–7, 7.3, 7.4; 244/14, 77, 3.1, 14.3; 178/6.8, 6, 7.2

[56] References Cited

UNITED STATES PATENTS

| | | | |
|---|---|---|---|
| 1,747,664 | 2/1930 | Droitcour | 343/7 |
| 2,480,068 | 4/1949 | Wolff | 343/7.3 |
| 2,480,868 | 9/1949 | Marshall | 343/7 |
| 2,516,356 | 7/1950 | Tull et al. | 343/7 |
| 2,512,693 | 6/1950 | Sparks et al. | 99/285 |

FOREIGN PATENTS OR APPLICATIONS

| | | | |
|---|---|---|---|
| 352,035 | 6/1931 | Great Britain | 343/7 |

OTHER PUBLICATIONS

"Flying Torpedo with an Electric Eye" Reprint from R.C.A. Review, Sept. 1946, Vol. VII, No. 3

Primary Examiner—B. A. Borchelt
Assistant Examiner—T. H. Webb
Attorney—Q. B. Warner and Claude Funkhauser

EXEMPLARY CLAIM

1. In a discriminatory guidance system for self-directing an aircraft to home on a selected target disposed within a group of similar targets, a screen for receiving the target image, a first and second cyclically operating generating means cooperatively performing to convert the received screen image into a series of sequential electrical image signals, pulse producing means actuated by the first generating means for providing a tracking pulse at a given time during selected cycles of the first generating means, gating means responsive to the pulse producing means and jointly controlled by both generating means to allow tracking pulse passage during a given portion of the second generated cycle, and coincident measuring means energized by the electrical image signals and the gated tracking pulses to provide error signals proportional thereto, said error signals fed back to the pulse producing means for controlling the time during the cycle of the first generating means at which the tracking pulse is generated.

12 Claims, 19 Drawing Figures

INVENTORS
WILLIAM J. NOLAN Jr.
FREDERICK C. ALPERS

BY
ATTORNEYS

FIG. 3 SYSTEM TIMING DIAGRAM

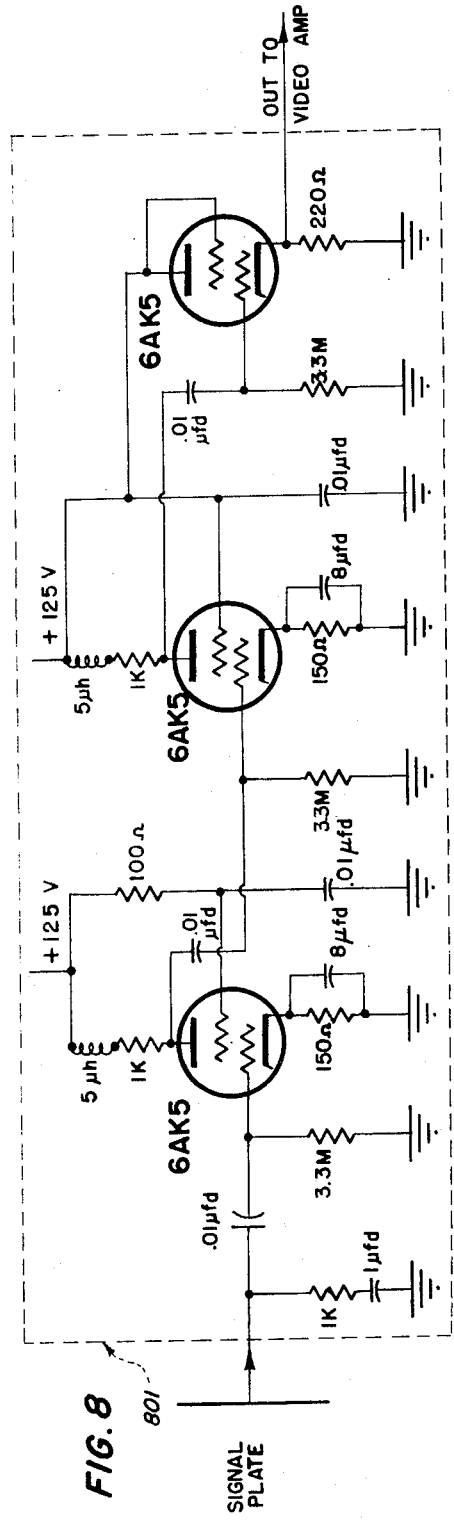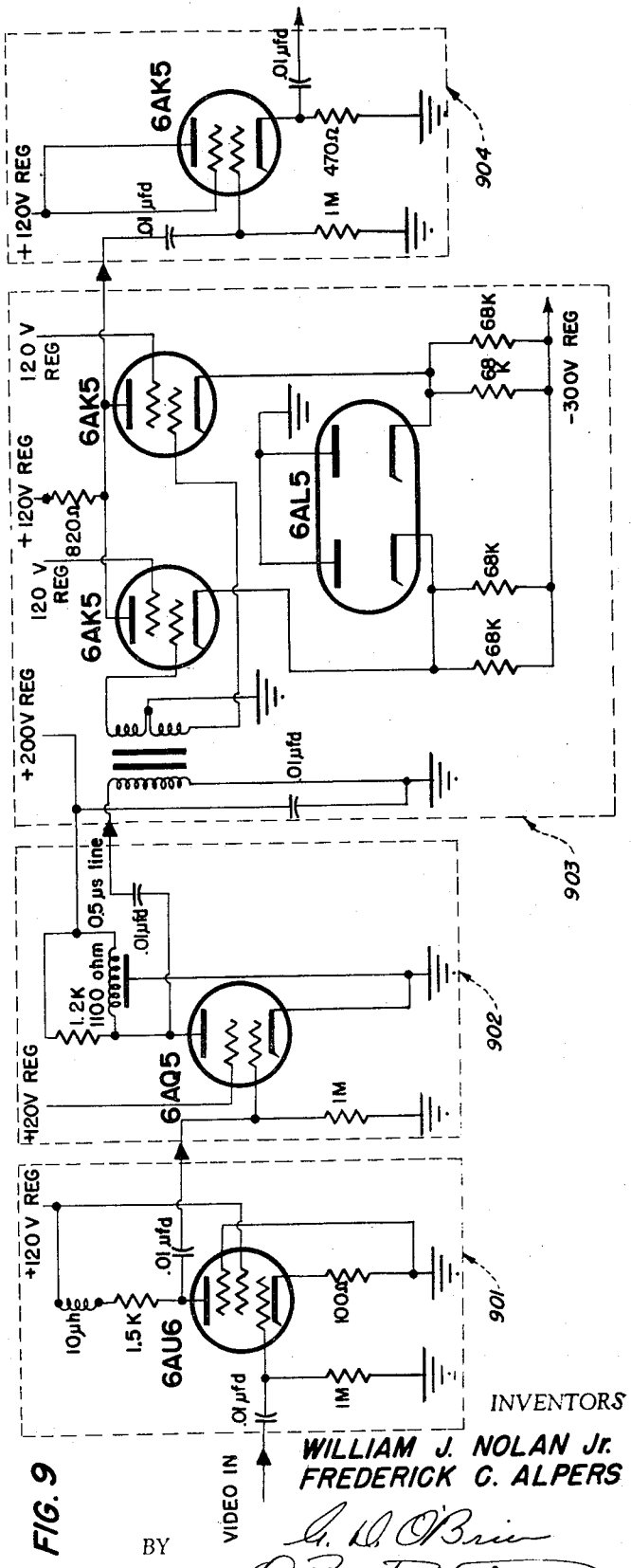
FIG. 8
FIG. 9
INVENTORS
WILLIAM J. NOLAN Jr.
FREDERICK C. ALPERS
ATTORNEYS

BLANKING PULSE TIMING DIAGRAM

INVENTORS
WILLIAM J. NOLAN Jr.
FREDERICK C. ALPERS

BY
ATTORNEYS

DISCRIMINATORY MISSILE GUIDANCE SYSTEM

The invention described herein may be manufactured and used by or for the Government of the United States of America for governmental purposes without the payment of any royalties thereon or therefor.

This device relates to an automatically operating aircraft homing guidance system, and more particularly to a visible or invisible light image responsive intelligence and control system for directing a guided missile to home on a selected object.

Systems for directing the flight path of guided missiles to home on a given object generally comprise a rapidly responding sensing means to determine the continually varying position of the object with respect to the aircraft heading, an intelligence means responsive to the sensed object locations for selecting the correct aircraft heading to reach the object, and an autopilot responsive to derived intelligence for energizing the aircraft controllers to position and maintain the aircraft heading along the selected flight path toward the target. In systems of this kind many types of sensing and intelligence means have been proposed, however, the most common and generally the most satisfactory of these devices due to the high speed of response and the long operating range are the radar detecting and automatic tracking devices.

Although at the present time these radar detecting and tracking circuits have reached a relatively advanced state of development capable of operation over long ranges with high accuracies, they are inadequate for detecting complex targets such as one of a group of buildings in a congested area, one of a convoy of ships within a harbor, or any land affixed structure built close to the surrounding land such as a bridge, supply dump etc. This inadequacy of radar detection for targets of the above types is due primarily to the inherent characteristics of the radar intelligence which indicate merely the range and angle of a body interrupting and reflecting high frequency pulses of electromagnetic energy. Thus a plurality of bodies such as building or ships within a congested group, or low lying structures close to the ground reflect a plurality of electrically indistinguishable pulses disabling the intelligence and control circuits from discriminating therebetween and following a selected object of the group.

The present device in order to correct for this lack of discrimination inherent in the radar type guidance systems, provides a passive, fast responding sensing and intelligence system for locating and automatically tracking a selected target by means of the light image reflected from the target, whereby targets heretofore indistinguishable from the surrounding land, or indistinguishable from clusters of surrounding similar objects when scanned by radar, may be accurately located and tracked by employing the actual light image of the target. The thus derived intelligence may then be employed to direct a flying missile to seek and destroy this selected target by detonating an explosive charge upon contact with the target, or upon reaching a predetermined range therefrom.

It is accordingly one object of this invention to provide a homing guidance system for directing a pilotless aircraft to a selected distant target.

A further object of this invention is to provide a guidance system responsive to the optical image of a distant target for enabling a pilotless aircraft to home by pursuit navigation on this distant target.

A further object of this invention is to provide a guidance system for automatically tracking in azimuth and elevation four sides of a selected distant target.

A still further object of this invention is to provide a guidance system for a pilotless aircraft operable to automatically track a distant object and distinguish between similar objects adjacent thereto.

A further object of this invention is to provide a sensing and intelligence system for locating and automatically tracking a selected target by means of light energy reflected therefrom.

A further object of this invention is to provide a passive light image responsive guidance system for enabling a guide missile to home on a selected target in azimuth and elevation.

A still further object of this invention is to provide a guidance system for a pilotless aircraft operable to sense one of a plurality of similarly disposed distant objects and automatically track this selected object in azimuth and elevation.

A further object of this invention is to provide a passive optically responsive sensing and automatic tracking system for enabling a pilotless aircraft to home on a distant selected object within a cluster of similar objects, by means of a light image reflected therefrom.

Other objects and advantages of the present invention will be readily apparent to those skilled in this art during the course of the following description, particularly directed to one preferred embodiment of the present invention and taken in connection with the accompanying drawings forming a part of this specification in which:

FIG. 7A is a detailed schematic diagram of the circuits of FIG. 7;

FIG. 8 is a detailed schematic diagram of a video preamplifier circuit;

FIG. 9 is a detailed schematic diagram of a video differentiating circuit, and a video rectifier circuit;

FIG. 11A is a detailed schematic diagram of one preferred embodiment of the circuits of FIG. 11;

Figure 1:
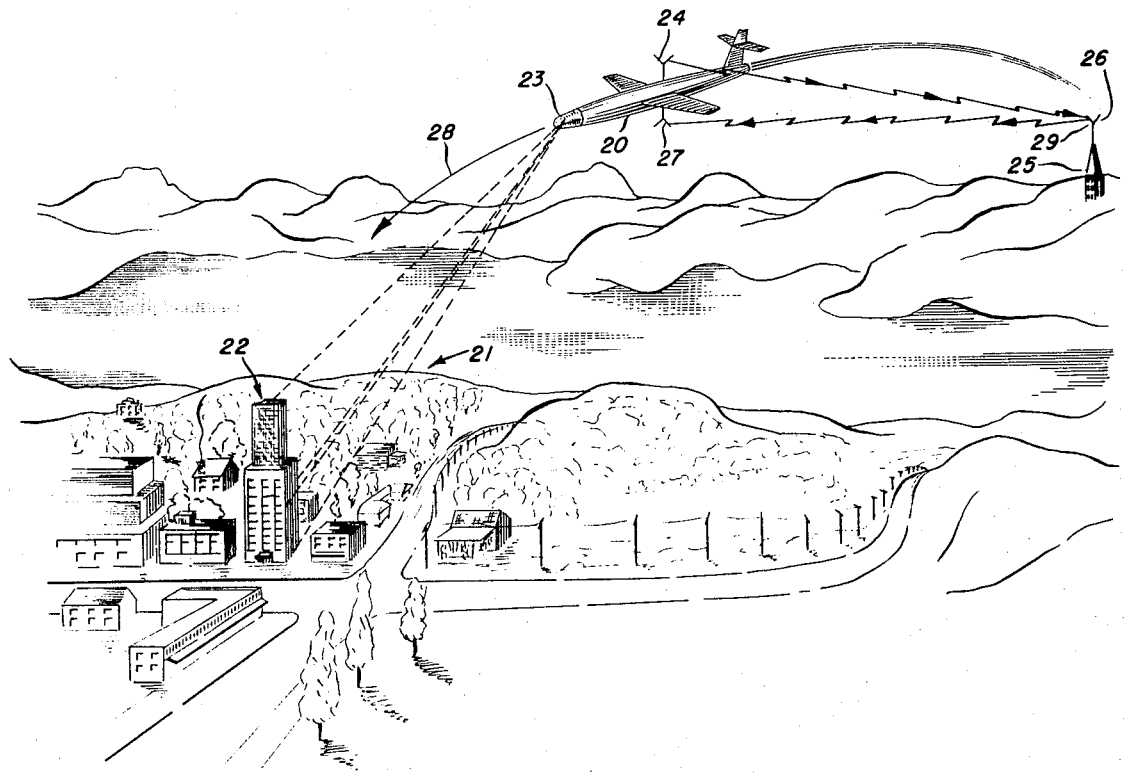
FIG. 1 is an illustrative sketch of the homing missile, the initial control station, and the target.
Figure 1A:
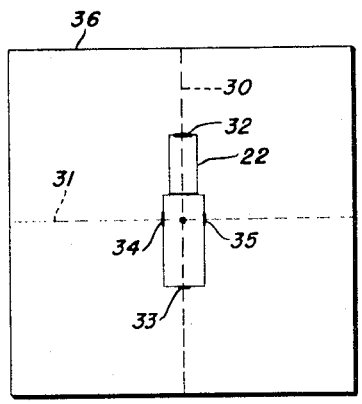
FIG. 1A is an enlarged view of the image reflected by the target of FIG. 1 on a light responsive electrical converting screen employed in the instant system.

Basic Operation of the Optical Guidance System in a Homing Missile (FIG. 1 and 1A)

FIG. 1 is an illustrative sketch generally showing the operation of the preferred optical type homing guidance system in directing a pilotless homing missile to a selected target of the type heretofore inaccessible by radar sensing, in which the homing missile is designated by number 20, the selected target by 22, and an initial command guidance station by 25. The forward nose portion 23 of the missile 20 comprises a transparent housing within which is mounted a miniature television camera preferably employing a Vidicon miniature television tube. By a suitable lens system an optical image of the terrain ahead of the missile is projected on the light sensitive Vidicon tube screen where a modified form of television scanning converts the optical image to a series of electrical signals. A suitable transmitter within the missile having a transmitting antenna 24 automatically conveys this information to the initial command guidance station 25 where it is received by antenna 26 and directed to a remote operator with a television type receiver synchronized with the missile transmitter. Thus, the remote operator located at the initial command guidance station 25 has reproduced before him a picture of the terrain ahead of the flying missile. This remote operator has a monitoring transmitter, by means of which he may remotely control the flight path of the missile by generating electrical command signals over transmitting antenna 29 to a receiving antenna 27 located on the missile and connected to energize suitable missile autopilot controllers. When the desired target, such as the building 22 within the group of buildings 21, is picked up by the missile optical system and transmitted to the receiving station, the remote operator thereupon commands the missile 20 towards this target, and by means of his remote control energizes a plurality of automatic tracking circuits within the missile intelligence system, causing them to follow this selected target image on the Vidicon screen, and thereafter enabling the missile optical guidance system to direct the missile automatically and without further command from the remote operator on a homing pursuit flight path to the target. Once the automatic guidance system within the missile is energized the operator is no longer required to exercise further control, however he is nevertheless provided with a televised target image for purposes of observation.

In brief then, the monitoring operator remotely directs the initial flight path of the pilotless missile, and selects a target within the optical vision of the missile light responsive sensing system. Once this target has been selected, the operator thereupon remotely adjusts the missile automatic tracking circuits to follow the target by instructing the missile autopilot to home on this selected target, the remote operator exercising no further control, but being capable of observing the target during the automatic homing attack run.

Thus, during the initial remotely controlled command guidance and later automatic homing guidance of the missile toward the target, the target reflected light image comprises the sole sensed information derived by the missile, and the position of this image on the sensing screen the sole means for determining the pursuit path to reach the target.

Although this particular sketch illustrates a fixed land target and a fixed land based initial control station, it is contemplated that this preferred type optical guidance system may be readily used to seek and destroy moving targets either on land, water, or air; further the initial controlling station may also comprise a moving vehicle such as a ship, aircraft, or land craft carrying the requisite remote receiving and transmitting equipment.

The proposed automatic tracking circuits referred to above are adapted to respond to the position of the target image projected upon the light sensitive screen, and slave the missile flight heading in both azimuth and elevation to always maintain this image about the screen center, thereby continually guiding the missile nose to point directly at the target. FIG. 1A is an enlarged view of the selected target image projected by the lens system upon the light sensitive pickup screen within the missile nose, in which the target is designated 22, the screen 36, the top and bottom edges of the target image 32 and 33, and the left and right target images edges 34 and 35. As illustrated in this figure, the top and bottom edges of the target image are equidistant from the horizontal dotted line 31 bisecting the screen 36, and the left and right edges of the target image 34 and 35 are positioned equidistant from the vertical dotted line 30 bisecting the screen, thus indicating that the missile 20 is heading directly on target. However, if the missile changes azimuth direction to the right or left, the position of target image 22 on the screen moves to the left or right respectively, and the left and right edges of the target image are no longer equidistant from the screen center, thereby indicating an off-target missile heading in azimuth. Similarly if the missile changes elevation direction, the top and bottom edges of the target image are no longer equidistant from the screen center indicating in off-target missile heading in elevation. It is apparent therefore, that a provision of means for tracking the four edges of the received target image and directing the missile flight heading to maintain the opposite edges equidistant from the screen center may be employed for automatically guiding an aircraft along a direct homing path toward the target, and generally this procedure is followed in the preferred embodiment of the present system of which a more detailed disclosure found hereinafter in conjunction with FIGS. 1B–12 inclusive.

Figure 1B:
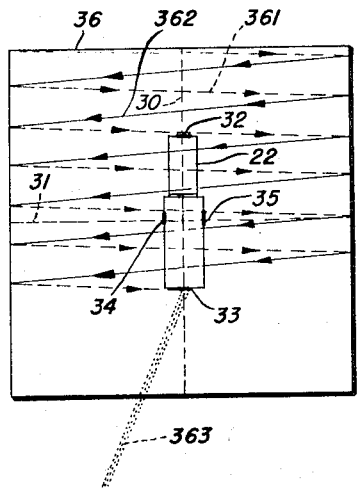
FIG. 1B is an enlarged view similar to FIG. 1A illustrating the path of a cathode ray beam in tracing a first scanning pattern on the screen during each cycle.
Figure 3:
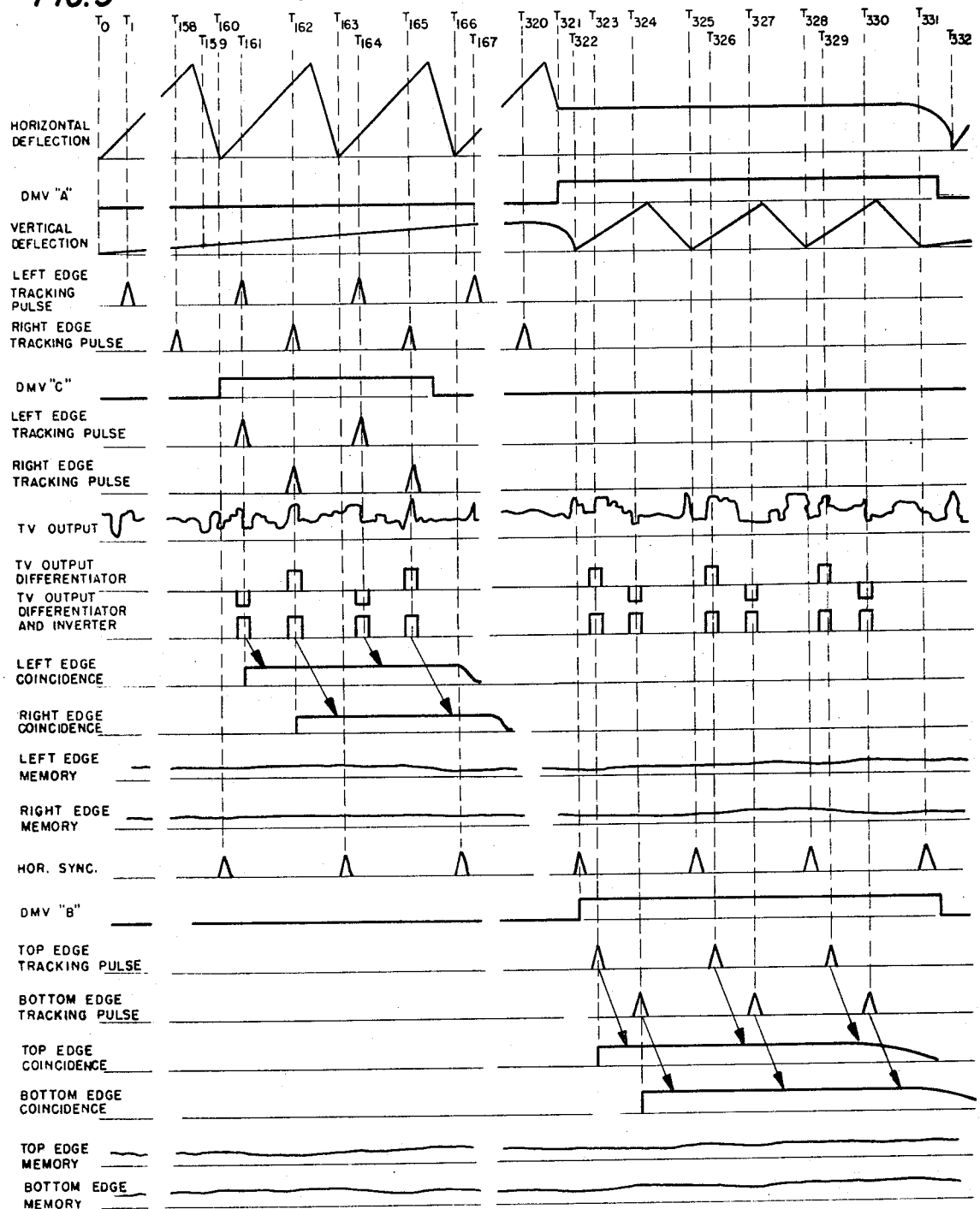
FIG. 3 is a timing diagram showing the electrical waveforms generated by circuits and the time relationship therebetween in the preferred system of FIG. 2.

Sensing System-Electrical Conversion of Light Image (FIGS. 1B and 3)

Figure 1C:
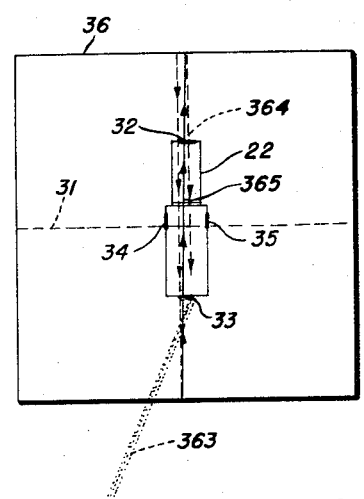
FIG. 1C is an enlarged view similar to FIG. 1A illustrating the path of the cathode ray beam in tracing a second scanning pattern on the screen during each cycle.

In order to employ the target light image projected on the Vidicon screen for performing the above-mentioned functions, three types of information must initially be obtained therefrom in electrical form; the first comprises the complete electrical target image for transmission to the remote operator, the second, electrical signals indicating the positions of the left and right target edges projected on the screen for automatic azimuth control of the missile heading, and the third, electrical signals indicating the positions of the top and bottom target edges projected on the screen for automatic elevation control of the missile heading. To obtain these three forms of sensed data the selected target image 22 of FIG. 1A is preferably converted into a series of electrical signals by bombarding the Vidicon screen face with a cathode ray beam in two separate sequential patterns during each repetitive cycle. The first pattern comprises a conventional television type scanning of the complete screen face by a series of horizontal lines each vertically displaced by a minute increment as shown by the exaggerated sketch of FIG. 1B, wherein the Vidicon screen is designated 36, the horizontal scan lines or the path of the scanning cathode ray beam during the horizontal sweep by dashed lines designated 361, the path of the scanning cathode ray beam during the horizontal sweep return or "flyback" by solid lines 362, the cathode ray scanning beam by dots 363, and the target image 22. This first scanning pattern enables the generation of the Vidicon photo-conductive screen of electrical signals containing the desired information of types one and two, namely electrical signals representing the positions of the received left and right target image edges. The second pattern comprises scanning only a portion of the Vidicon screen about the screen vertical center line by means of a series of vertical sweeps from top to bottom as shown by FIG. 1C, wherein the Vidicon screen is designated 36, the path of cathode ray beam during the vertical scan by dash line 364, the path of the vertical scan return or "flyback" by solid line 365, the cathode ray scanning beam by dotted lines 363, and the target image by 22. The second scanning pattern enables electrical signals to be generated by the Vidicon photo-conductive screen which are representative of the desired information of type three, namely electrical signals representing the positions of the top and bottom target edge images.

These two scanning patterns are employed to derive these three forms of sensed data to obtain a greater degree of target discrimination than would be obtainable were a single scanning pattern, such as the conventional television type shown by FIG. 1B, provided alone for each cycle. For, as may be observed from FIGS. 1B and 1C, the scanning beam is directed in paths transverse to all the particular target edges to be detected, whereby the left and right target edge images are more readily distinguished from the image background by a horizontal sweeping beam of FIG. 1B, and the top and bottom target edge images are more readily distinguished from the image background by a vertical sweeping beam of FIG. 1C. Further, by rapidly scanning the target image along lines extending transverse to the particular edges whose positions on the screen are to be determined, automatic tracking of these edges is more readily obtained, as will be more fully described in connection with the intelligence system operation.

During the homing pursuit path the size of the received target image and the position of this received image upon the screen are continually changing due to the decreasing missile to target range and the many factors tending to divert the missile from a true homing path toward the target, so that both the vertical and horizontal patterns of optico-electrical reproduction are cyclically repeated to enable a continual sensing of the target position, their selected frequency of repetition being determined by such considerations as the relative speeds of the target and missile movement, the persistance of vision of the Vidicon photo-conductive screen, and the accuracy of guidance desired.

Figure 2:
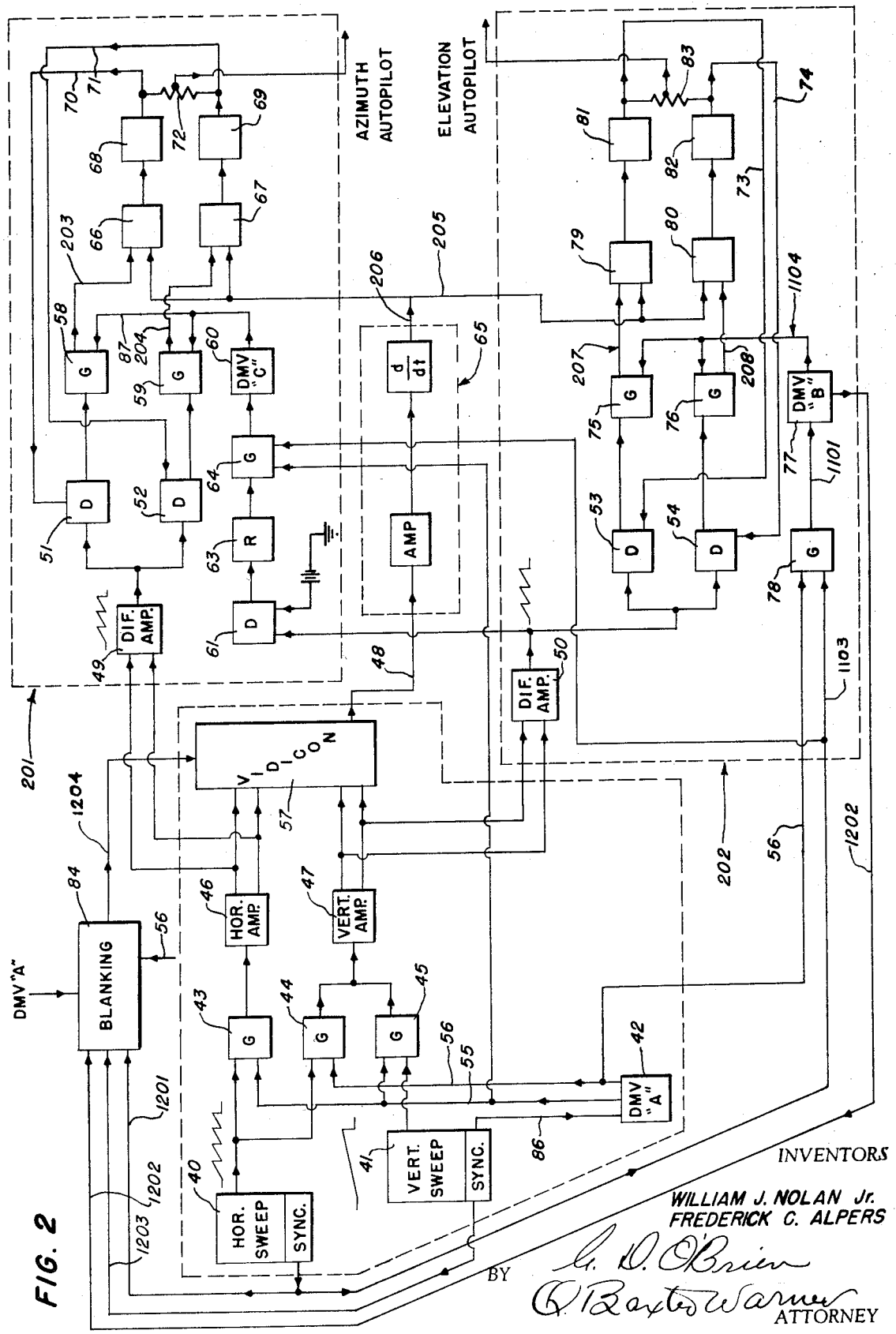
FIG. 2 is a block diagram of the overall light responsive electrical guidance system.

Referring now to the block diagram of the overall guidance system of FIG. 2 for initially considering the operation of the preferred circuits for cyclically bombarding the Vidicon tube screen in the two scanning patterns illustrated by FIGS. 1B and 1C, the two blocks designated horizontal sweep 40 and vertical sweep 41, located on the left hand side of the FIG., comprise electrical saw-tooth voltage generators preferably operating at approximately the frequencies of 10,000 cycles per second and 60 cycler per second respectively, and the box 57, located in the central portion of the FIG., and designated Vidicon comprises the preferred television type camera pickup tube. Saw-tooth voltages generated by these sweep generators are conveyed to three vertically aligned scanning gate circuits 43, 44, and 45 each designated G, and operable to pass or prevent the passage of sweep voltages therethrough dependent upon the value of separate gating control potentials over lines 55 and 56, which are generated by a single stability state multivibrator indicated by block 42 designated DMV "A" in the lower left of the FIG.. DMV "A" in its stable state energizes line 55 with a proper voltage value to open gates 43 and 45 passing the horizontal and vertical sweep signals respectively, and energizes line 56 with a second voltage value to close gate 44; while when it is flipped over to its unstable state it energizes line 56 to open gate 44 passing the horizontal sweep signal, and energizes line 55 to close gates 43 and 45. However, gate 43 in its closed position is adapted to generate a fixed voltage signal to the succeeding circuits for purposes to be fully described hereinafter. Two blocks designated horizontal deflection amplifier 46 and vertical deflection amplifier 47, comprising voltage current converting amplifiers, are interposed in the circuit connecting the output of the gate circuits to the Vidicon magnetic deflecting coils, the horizontal deflection amplifier 46 connecting the output of gate 43 to the Vidicon horizontal deflection coil, and the vertical deflection amplifier 47 connecting the common output of gates 44 and 45 to the Vidicon vertical deflecting coil. These devices convert a single ended saw-tooth voltage to a balanced push-pull linear saw-tooth current, suitable for energizing the Vidicon horizontal and vertical magnetic beam deflection coils.

During the forward or positive going portion of the vertical sweep generator 41, DMV "A" remains in its stable state permitting the horizontal sweep generator signal to pass through gate 43, and energize horizontal deflection amplifier 46 to repeatedly and rapidly deflect the Vidicon beam in a plurality of horizontal sweeps. Simultaneously the Vidicon vertical deflecting coil is energized by the vertical sweep generator signal 41 passing through gate 45 and converted by the vertical deflection amplifier 47 to gradually position the rapidly moving horizontal line scanning sweep from the screen top to bottom, thereby completely scanning the Vidicon screen in the first scanning pattern shown by FIG. 1B. At the termination of the forward or positive going portion of the vertical sweep and the commencement of the vertical "flyback", DMV "A" is triggered by a vertical sync pulse, comprising a differentiated vertical sweep generator signal over line 86, to flip over to its unstable state thereby energizing line 56 to open gate 44, and effectively deenergizing line 55 to close gates 43 and 45. Open gate 44 passes the horizontal sweep generator voltage from 40 to the vertical deflection amplifier 47, thereby vertically sweeping the Vidicon screen at the horizontal sweep frequency. Simultaneously, during the closed position of gate 43, a fixed selected voltage energizes the horizontal amplifier 46 thereby fixing the horizontal position of the scanning beam at the screen center during the vertical top and bottom scanning. This latter mode of scanning the Vidicon screen taking place during the vertical "flyback" constitutes the second scanning pattern discussed above and illustrated by FIG. 1C. Upon the passage of a given time period determined by the values of the DMV "A" circuit components, delay multivibrator DMV "A" 42 automatically flips back to its stable position restoring the original potentials on gate controlling lines 55 and 56 and thereupon conditioning the scanning pattern controlling gates 43, 44, and 45 to terminate the second scanning pattern shown by FIG. 1C and repeat the first scanning pattern shown by FIG. 1B, thereby completing both patterns of the first scanning cycle and automatically beginning the second scanning cycle.

Thus, the cyclic scanning of the Vidicon photoconductive screen to convert the received target image into suitable electrical form for energizing the intelligence system, occurs at the frequency of the vertical sweep generator. Each cycle of this scanning process is divided into two sequential patterns, time controlled by the delay multivibrator DMV "A" in response to the vertical sweep generator sync signal, the first taking place during the forward or positively increasing portion of the vertical saw-tooth wave comprises scanning the complete photo-conductive screen face by sweeping an electron beam across the screen in a plurality of horizontal lines each vertically displaced by a minute increment (FIG. 1B), and the second taking place during the return of the vertical generator saw-tooth wave to zero, commonly termed the "flyback time", comprises positioning the cathode ray beam adjacent the vertical center line of the photoconductive screen and rapidly sweeping the beam from top to bottom (FIG. 1C).

Referring now to FIG. 3 for a timing diagram showing selected electrical waveforms generated by the proposed automatic guidance system circuits illustrated in the FIG. 2 block diagram, to enable a clearer understanding of the Vidicon screen scanning operation, twenty-three electrical wave forms are vertically aligned over a common time base substantially representing the interval of one complete scanning cycle of the Vidicon screen or one cycle of the vertical saw-tooth generated wave, and each of these twenty-three wave forms is labeled to provide suitable reference to the circuits generating this wave form shown in FIG. 2. The upper first and third curves, labeled horizontal deflection and vertical deflection respectively, represent the waveforms energizing the Vidicon horizontal and vertical magnetic deflection coils, and the second curve, labeled DMV "A", represents the voltage output on line 55 of delay multivibrator DMV "A". Upon the initiation of the scanning cycle at time $T_0$, the voltage on control line 55 is at its more negative value as shown, enabling the Vidicon horizontal magnetic deflection coil to be energized by the horizontal saw-tooth generator wave as shown by the high frequency saw-tooth wave, and enabling the Vidicon vertical magnetic deflection coil to be energized by the wave form representative of the lower frequency vertical sweep generator. Upon the termination of the positive going portion of the vertical saw-tooth wave and the initiation of the vertical flyback taking place at time $T_{321}$ in the cycle, DMV "A" line 55 is flipped to its more positive value by a vertical sync pulse (not shown), enabling the second scanning pattern during the first cycle to commence, whereby the Vidicon horizontal magnetic deflection coil is energized by a constant value signal, and the Vidicon vertical deflection coil is energized by a high frequency saw-tooth wave derived from the horizontal sweep generator as shown.

For purposes of simplification of the timing diagram and in order to condense this representation, some repetitive portions of each of the wave forms have been omitted, namely the portions occurring between times $T_1$ and $T_{158}$ and between times $T_{167}$ and $T_{320}$, all occurring within the first scanning pattern; however, the wave forms omitted are merely repetitive portions of those shown, and by this deflection it is possible to represent the horizontal deflection by approximately four enlarged saw-tooth waves when in actuality the Vidicon screen face during the first scanning pattern is swept by approximately 150 horizontal lines each vertically displaced by minute increments, and therefore approximately 150 saw-tooth waves are generated during the interval between $T_0$ and $T_{321}$ by the horizontal sweep generator.

General Intelligence System Operation For Automatic Guidance of the Missile in Azimuth and Elevation (FIG. 2)

Generally the proposed automatically operating intelligence system may be divided into two independently operating channels performing in time sequence during each Vidicon scanning cycle, the first or azimuth intelligence channel responding to the Vidicon electrical output during the first pattern of each cycle to determine the azimuth heading of the missile with respect to the target in relation to the desired azimuth heading with respect to the target, and thereafter generating error signals to the autopilot for changing the missile azimuth heading to correspond with the desired heading, and the second or elevation intelligence channel responding to the Vidicon output during the second scanning pattern of each cycle to determine the elevation heading of the missile with respect to the target in relation to the desired elevation heading with respect to the target, and thereafter generating error signals to the autopilot for changing the missile elevation heading to the desired heading. As discussed above, the desired heading of the missile is on a homing pursuit path toward the target in both the azimuth and elevation directions, and therefore considering the vidicon screen as a "gun sight" wherein the screen bisecting horizontal and vertical lines (31 and 30 FIG. 1A) constitute the "cross-hairs", this desired heading is obtained when the target image is received "centered in the cross-hiars", or more precisely when the left and right outside edges of the received target image cut the screen bisecting horizontal line (31) at points equidistant from the screen center, and the top and bottom outside edges of the received target image cut the screen bisecting vertical line (30) at points equidistant from the screen center. Further applying the above analogy, the relation of the actual heading of the missile to the desired heading of the missile may be determined by the amount the received target image is received "off-center in the cross-hairs" and the directions of "off-center reception".

Each of the intelligence channels performs the above operations with respect to two opposite target edge images, the azimuth intelligence channel continuously determining the screen positions where the received left and right outside target edge images cut the screen bisecting horizontal line, and the elevation intelligence channel continuously determining the screen positions where the received top and bottom outside target edge images cut the screen bisecting vertical line. Thereafter each channel continuously compares the distances from the screen center of the two positions determined by it and continuously generates error signals to the missile autopilot appropriate for slaving the missile flight heading to always receive the light images of the selected opposite target edges equidistant from the screen center, thereby enabling the missile to automatically home by pursuit navigation in azimuth and elevation on this selected target.

Determination of the screen position where a received target image edge cuts a screen bisecting line is termed throughout this specification and claims, as tracking the target edge image.

The tracking of each target edge image upon the screen is preformed cyclically generating an electrical tracking pulse at a predicted time when the portion of the Vidicon screen receiving the target edge image is being simultaneously scanned by the cathode ray beam. This tracking pulse and the electrical Vidicon output signal resulting from the cathode ray bombarded target edge image are thereupon compared by a time coincidence circuit, and any correction signal indicating that these two pulses are not in time coincidence is fed back to vary the time at which the tracking pulse is generated in subsequent cycles, thereby obtaining the desired coincidence. Thereafter, additional circuits in each channel effectively compare the positions of opposite tracked target edges and energize appropriate autopilot circuits in accordance with an error signal indicating unequal distances of these edges from the screen center to slave the missile heading directly on a homing path toward target center. Of course, as the missile approaches the target, the target image upon the Vidicon screen becomes larger and therefore the received left and right, and top and bottom target image edges move outward away from the screen center; further should the missile deviate from a true homing pursuit path the received target edge images also vary their position on the screen. Accordingly the individual tracking of each received target edge image is cyclically repeated at a rate sufficient to compensate for these variations and enable a continuous tracking of the four target edges and a continuous automatic controlled guidance of the missile heading.

Referring again to the block diagram of FIG. 2 taken in connection with the wave form timing diagram of FIG. 3 to enable an understanding of the proposed azimuth and elevation intelligence channel circuits operating in response to the Vidicon electrical output in carrying out the above functions to automatically guide the missile to the target, the azimuth channel comprises a plurality of circuits in the upper center and upper right of the figure enclosed within a dotted line generally designated 201, and the elevation intelligence channel comprises a plurality of circuits in the lower center and lower right of the figure enclosed within a dotted line generally designated 202. Each of these channels is divided into two identically operating sections, each section adapted to automatically and continually track the position of one of the four received target edge images, the two sections in the azimuth channel 201 being adapted to continually track the positions of the left and right target edge images, and the two sections in the elevation channel being adapted to continually track the positions of the top and bottom target edge images.

Azimuth Intelligence Channel (FIGS. 2 and 3)

Considering first the azimuth intelligence channel 201, operating only during the first scanning pattern of each cycle (FIG. 1B), tracking pulses are generated by the upper section over output line 203 and tracking pulses are generated by the lower section over output line 204. Electrical Vidicon signals derived from the scanned photo-conductive screen are conducted over line 206 to the inputs of units 66 and 67 constituting azimuth channel coincidence circuits, where selected Vidicon signals are compared in time with the azimuth tracking pulses from the upper and lower tracking sections. Time coincident reception of these input signals in either unit provides a zero error output, while out of coincidence reception of the tracking and Vidicon signals provides a voltage error output whose magnitude and polarity represent the degree of time displacement of the pulses and the chronological order of these pulses respectively. Error voltages generated by coincidence unit 66, representing the time difference of the left edge tracking pulse and the left target edge Vidicon signal, are thereafter conducted to memory circuit 68, and error voltages generated by coincidence unit 67, representing the time difference of the right edge tracking pulse and the right target edge Vidicon signal, are conducted to memory circuit 69. For the purposes of the present discussion, although a simplification of actual operation, it can be considered that these memory units are adapted to "remember" the former screen positions of the target edge images and to generate voltage signals corresponding to the former horizontal positions of the received target edge images upon the screen, or more precisely to generate a voltage signal whose magnitude is related to that required for deflecting the cathode ray beam from the left edge of the Vidicon screen horizontally across until the beam bombards the point where the selected edge image cuts the screen bisecting horizontal line 31 (for example points 34 or 35 of FIG. 1B). Thereafter the coincidence error signals cause an increase or decrease in this memory output as the image of the target edge varies its position on the screen. Thus, the signals generated by azimuth intelligence channel memory units 68 and 69 effectively represent the positions of the target image left and right edges on the screen, or more precisely the screen points where these left and right edges cut the screen bisecting horizontal line 31. However, assuming the missile is correctly heading "on target" in azimuth, the voltage output of memory unit 68, representing the target image left edge, is smaller than a signal representing the position of the screen center point by an amount equal to that which the voltage output of memory unit 69, representing the target image right edge, exceeds a signal representing the position of the screen center point. Therefore, averaging these values provides a voltage proportional to the screen position of a point equidistant from the left and right target image edges, or in effect the azimuth heading of the missile with respect to the target. Thereafter comparing this average voltage with a fixed voltage representing the position of the screen center (a voltage related to that required for horizontally deflecting the cathode ray scanning beam from the left edge of the screen to the center) a resultant error voltage is obtained representative of the difference between actual missile heading and on target heading to energize the autopilot appropriately for correcting the missile course to target in azimuth. Center tapped resistor 72 shown connecting the outputs of upper and lower azimuth channel memory units 68 and 69 constitutes the means for averaging these values, for as is well known the voltage existing at the center tap of a resistor connecting two potential sources is proportional to the average value of these potentials.

Output voltages from the upper and lower azimuth channel memory units 68 and 69 are further fed back over lines 70 and 71 to the azimuth tracking pulse generators 51 and 52 varying the time at which azimuth tracking pulses are generated in accordance with the instantaneous memory voltages, to continuously bring the tracking pulses into time coincidence with the Vidicon signals and enable the tracking pulses to follow the positions on the screen bisecting horizontal line being cut by the target image left and right edges.

In the tracking of the target image left and right edge positions cutting the screen horizontal dividing line, it may be recalled that it is first necessary to generate a tracking pulse at a predicted time that the screen position receiving this selected target image is being scanned, which as may be seen by reference to the first scanning pattern shown by FIG. 1B occurs for the target image left edge 34 as the cathode ray bombarding beam is horizontally positioned the distance from the left of the screen to edge 34 and simultaneously vertically positioned the distance from the top of the screen to screen bisecting horizontal line 31, while for the target image right edge 35 the beam is horizontally positioned the distance from the rest position of the beam at the left of the screen to edge 35 and simultaneously vertically positioned the distance from the top of the screen to screen bisecting horizontal line 31. However, as the horizontal positioning of the cathode ray bombarding beam is controlled by the horizontal sweep generator 40, and the vertical positioning of the cathode ray bombarding beam is controlled by the vertical sweep generator 41, the instantaneous voltage values produced by these sweep generators may be employed to indicate screen positions, and to actuate the tracking pulse generators when a given screen position is being scanned. Azimuth tracking pulse generators 51 and 52 then shown at the upper center of FIG. 2, preferably comprise voltage magnitude responsive trigger circuits adapted to respond to a saw-tooth generated voltage, which simultaneously controls the scanning of the Vidicon screen, and deliver tracking pulses when the value of this saw-tooth generated voltage reaches values sufficient to deflect the cathode ray scanning beam from its rest position to the target image edges 34 and 35, upper section tracking pulse generator 51 adapted to trigger as the saw-tooth energizing wave reaches a value sufficient to deflect the cathode ray beam to bombard left image edge 34 (FIG. 1B), and lower section tracking pulse generator 52 adapted to trigger as the saw-tooth energizing wave reaches a value sufficient to deflect the cathode ray beam to bombard right image edge 35 (FIG. 1B). This saw-tooth voltage is supplied for the azimuth channel tracking pulse generators 51 and 52 by a converting amplifier shown by a block designated 49, which is connected to the output of horizontal deflection amplifier 46 and adapted to convert the push-pull saw-tooth current energizing the Vidicon horizontal coil back to an inphase saw-tooth voltage.

Although this saw-tooth voltage may be taken directly from the output of horizontal sweep generator 40, the conversion shown is desired for enabling greater flexibility of circuit construction.

This saw tooth timing voltage is then directed to the left edge tracking pulse generator 51, shown in the upper section of the azimuth intelligence channel 201 and labeled D, which is adapted to generate a sharp edge tracking pulse each instant the linear saw-tooth input wave reaches a preselected voltage value determined by a variable control feedback signal on line 70 from memory unit 68.

Control feedback voltage on 70 is initially determined by the remote operator during the target selection and commanded remote missile guidance period, who, after positioning the missile flight heading to receive the opposite target edge images equidistant from the Vidicon screen center thereby indicating a correct flight path toward the target, manually selects the value of tracking pulse control feedback voltage on 70 to enable the generation of left edge tracking pulses in time coincidence with the Vidicon signal output indicating the scanned left edge of the target image. However, after this initial manual selection, memory circuit 68 in the azimuth intelligence channel 201 automatically controls the value of this feedback voltage on 70 causing the generation of tracking pulses at such times as to remain in coincidence with the scanned left target edge 34 Vidicon signal and follow this target edge as its position varies during the flight path.

Thus left edge tracking pulse generator 51 in the upper section of the azimuth intelligence channel 201 generates a single pulse during each positive going portion of the saw-tooth voltage cycle generated by converting amplifier 49, when this instantaneous saw-tooth wave reaches a voltage value determined by the feedback voltage on line 70. Similarly, the right edge tracking pulse generator 52 shown in the lower section of the azimuth intelligence channel 201 and labeled D comprises an identical device responsive to the same azimuth tracking saw-tooth voltage to generate a sharp edged tracking pulse in time coincidence with the Vidicon signal output indicating the scanned right target edge image 35 in response to a second feedback control voltage on line 71.

These tracking pulses, adapted to be generated by the upper and lower sections of the azimuth intelligence channel each time the cathode ray scanning beam is horizontally positioned a distance corresponding to the previously determined horizontal positions of the left and right target edge images upon the Vidicon screen, are illustrated by two curves of the wave form timing diagram FIG. 3 labeled left edge tracking pulse (illustrating the wave form of the pulse generated by unit 51 during each horizontal sweep cycle at times $T_1$ . . . $T_{161}$, $T_{164}$, $T_{167}$ etc. during the first scanning pattern), and labeled right edge tracking pulse (illustrating the wave form of the pulse generated by unit 52 during each horizontal sweep cycle at times $T_2$ . . . $T_{158}$, $T_{162}$, $T_{165}$, . . . $T_{320}$ in the course of the first scanning pattern).

Subsequently each of these left edge tracking pulses are conveyed to a gate circuit 58 shown in the upper section of azimuth intelligence channel 201 and labeled G, which is adapted to pass or prevent the passage of these pulses therethrough depending upon the value of an azimuth gate control voltage on line 87, and each of these right edge tracking pulses transmitted by generator 52 are conveyed to a gate circuit 59 shown in the lower section of azimuth intelligence channel 201 and labeled G, which passes or prevents passage of these pulses therethrough depending upon the same azimuth gate control voltage on line 87 as shown.

In order to fully appreciate the overall automatic tracking of the target left and right edge images, and the specific manner and time in which the various circuits function to provide this automatic tracking, reference is again made to FIGS. 1A and 1B taken with timing diagram FIG. 3. From the above discussion of the initial azimuth control voltage converter 49 and azimuth tracking pulse generators 51 and 52, it may be observed that left edge tracking pulses and right edge tracking pulses, shown by wave forms of timing diagram FIG. 3, are continuously generated once during each cycle of the horizontal sweep or approximately 150 pulses are generated by each generator during the first scanning pattern, FIG. 1B. However, as each horizontal sweep is displaced on the Vidicon screen to scan a single horizontal line, represented in FIG. 1B by dotted line 361, these tracking pulses are generated at times when the scanning beam is not bombarding the desired left and right target edge images 34 and 35, and may be scanning either vertically above or below the desired target image edge selected. Therefore, as it is desired to compare the time coincidence of the generated tracking pulses only with the Vidicon electrical output signal indicating the point where the selected target edge image cuts the screen bisecting horizontal line, the tracking pulses generated when scanning lines are vertically positioned above the target image or below the target image are discarded by providing gating means 58 and 59, preventing their passage through the circuit. These gating means are controlled by a timing circuit including a delay multivibrator DMV "C" which is employed to open the azimuth tracking gates 58 and 59, allowing the passage of left and right target edge tracking pulses therethrough only during the time interval the horizontal sweep lines are scanning the selected target image edge positions, which occurs during the first scanning pattern as the horizontal sweep lines 361 are vertically positioned adjacent the Vidicon screen dotted dividing line 31 shown by FIGS. 1A and 1B, and to close the azimuth tracking gates 58 and 59 preventing the passage of left and right edge tracking pulses during the remaining time intervals when the sweep lines 361 are vertically positioned either above or below the Vidicon screen dividing horizontal line 31.

Referring back to the system block diagram FIG. 2 and timing diagram FIG. 3, the azimuth gate control voltage on line 87 is generated by delay multivibrator DMV "C", represented as a block designated 60 located beneath the azimuth tracking gates 58 and 59 in the azimuth intelligence channel 201. This delay multivibrator is similar to that of DMV "A" 42, comprising a single stability state flip flop circuit normally providing a constant value signal on gate controlling line 87, and adapted to generate a second value signal on line 87 when flipped over to its unstable position, thereafter remaining in this unstable position for a preselected interval and then automatically returning to its stable position. A curve of the FIG. 3 timing diagram labeled DMV "C" illustrates the wave form generated by delay multivibrator "C" 60 over line 87 during the first scanning pattern of each cycle, wherein from time $T_0$ constituting the initiation of the first scanning pattern until time $T_{160}$, DMV "C" is in its stable position and the voltage over line 87 is relatively negative maintaining azimuth tracking gates 58 and 59 closed. However, at time $T_{160}$, DMV "C" is flipped to its unstable position providing a more positive voltage over line 78 and enabling azimuth tracking gates 58 and 59 to open. Thereafter azimuth tracking pulses are passed through the gates until time $T_{165}$ when delay multivibrator DMV "C" automatically returns to its stable state, reducing the voltage on line 87 and closing azimuth tracking gates 58 and 59 for the remainder of the scanning cycle. As generally discussed above, the time interval from time $T_{160}$ through time $T_{165}$, during which it is desired that azimuth tracking pulses be passed for comparison with the Vidicon output signals, is selected to coincide with the Vidicon scanning sweep adjacent the screen dividing horizontal line 31 (FIG. 1A), and accordingly timing devices are interposed in the circuit enabling delay multivibrator DMV "C" to be flipped over at this desired time. In order to avoid confusion at this point, a disclosure of these additional timing devices is presently deferred, however, the block diagram of these timing circuits is shown in enlarged view by FIG. 7 and a detailed disclosure thereof will be made hereinafter. Returning to FIG. 3, the two curves successively aligned below the delay multivibrator DMV "C" wave represent the left edge tracking pulses and right horizontal edge tracking pulses that pass through azimuth tracking gates 58 and 59 respectively, and as shown they pass through these gates only during the interval from time $T_{160}$ through time $T_{165}$.

Concurrently with the generation of the left and right edge tracking pulses, the Vidicon screen is bombarded by the cathode ray beam and the electrical Vidicon output signals converted from the received light image are generally illustrated by the curve labeled TV output of the FIG. 3 timing diagram. The magnitude of this signal at any time instant is proportional to the intensity of light received at a given point on the screen face, and accordingly as the intensity of the received light image varies irregularly so does the electrical output as shown.

From the irregular wave form illustrated it is necessary to select given characteristics of the target and employ these given characteristics to enable the target image edges to be ascertained, however as reflected light received from objects other than the desired target may equal in intensity that received from the target, discrimination by signal magnitude alone is undesirable. In the presently proposed system the irregular Vidicon electrical output is amplified and then differentiated, a large differentiated signal being indicative of a rapid change in received light as the bombarding cathode ray beam passes adjacent areas on the screen, thereby permitting the selected target to be ascertained whether the surrounding background reflects either more or less light than the target. Thus by differentiating the Vidicon electrical output either a dark target against a light background or a light target against a dark background may be determined. For the illustration shown by FIG. 3 a dark target against a light background is being sensed, for at time $T_{161}$ as the left edge of the target is being scanned, the cathode ray beam passes from the bright background image across the target image left edge 34 to the darker target and accordingly the Vidicon electrical output signal rapidly changes at this time from a higher to a lower value, similarly at later time $T_{162}$ the beam passes from the dark target image right edge 35 to the light background image whereby the Vidicon electrical output rapidly changes at this time from a lower to a higher value.

Amplifying and differentiating circuits for performing the above functions are shown in the FIG. 2 system block diagram as separate blocks in the center of the fig., enclosed within a dotted line labeled 65. Vidicon output signals are directed over line 48 to the input of these units, and amplified, differentiated, and inverted Vidicon signals are subsequently conducted over line 206 to the coincidence circuits as discussed above. The following curve after TV output of the FIG. 3 timing diagram illustrates selected wave forms of the Vidicon output after being differentiated, and as shown they comprise for each horizontal scanning sweep two bidirectional pulses. The first occurring at time $T_{161}$ represents the scanned left target edge image, and the second occurring at time $T_{162}$ represents the scanned right target edge image. Two remaining pulses shown by this curve during the first scanning pattern and occurring at times $T_{164}$ and $T_{165}$ similarly represent the left and right target edge images for a second horizontal scan of the screen adjacent the screen bisecting horizontal line 31.

Coincidence comparison of these differentiated Vidicon signals with the tracking pulses in this preferred system is more readily determined by comparing unidirectional pulses, and accordingly an inverting means is supplied to rectify the differentiated bidirectional Vidicon signals. The inverting circuit is not separately illustrated in the block diagram of FIG. 2 but is considered as enclosed within the block labeled $d/dt$ containing the differentiating unit. A curve labeled TV output differentiated and inverted of FIG. 3 illustrates the waveform of unidirectional pulses emanating from the output of the inverting unit to coincidence input line 205. Although the two curves following TV output illustrate only four pulses occurring during the first scanning pattern (time $T_0$ through time $T_{321}$) of each cycle, it is to be understood that each variation of the Vidicon electrical output is differentiated; however as the other differentiated pulses are not employed in the automatic guidance of the missile they are omitted for simplifying the illustration.

The wave form of the coincidence error signal generated by left edge coincidence unit 66 in the azimuth channel 201 of FIG. 2 is represented by a curve labeled left edge coincidence of the FIG. 3 timing diagram, and this signal represents the time coincidence error voltage between the left edge Vidicon signal (pulses at time $T_{161}$ and $T_{165}$ shown by arrows) and the left edge tracking pulses; and the wave form of the coincidence error signal generated by right edge coincidence unit 67 in the azimuth channel 201 of FIG. 2 is represented by a curve labeled right edge coincidence of the FIG. 3 timing diagram, which signal represents the time coincidence error between the right edge Vidicon signal (pulses at times $T_{162}$ and $T_{165}$ shown by arrows) and the right edge tracking pulses. Similarly a curve of FIG. 3 labeled left edge memory, represents the voltage generated by left edge memory unit 68 in the azimuth channel 201 which is modified once during each scan cycle by the left edge coincidence error to provide a true electrical indication of the screen position where the target image left edge (34 FIG. 1B) cuts the bisecting horizontal line 31; and a curve of FIG. 3 labeled right edge memory, represents the voltage generated by right edge memory unit 69 in the azimuth channel 201 which is modified during each scan cycle by the right edge coincidence error to provide a true electrical indication of the screen position where the target image right edge (35 FIG. 1B) cuts the bisecting horizontal line 31.

Summarizing, azimuth intelligence channel 201 automatically tracks the positions that left and right target edge images cut the screen bisecting horizontal line 31 and thereafter effectively compares their individual distances from the screen center to determine aircraft heading off-target. Tracking of the left and right image edges is performed during the first scanning pattern by generating two tracking pulses for each horizontal scan line, the position of these tracking pulses on the line being determined by two feedback signals. A timing device prevents these tracking pulses from passing through the channel until the screen is being scanned by a line adjacent the bisecting horizontal line, at which time the tracking pulses are conducted to two coincident circuits. Vidicon electrical image signals are simultaneously conducted to these coincidence circuits, where a time comparison is made of the tracking pulses and Vidicon output signals. Two memory circuits are provided to "remember" former screen positions of the left and right edges, and the coincidence error signals modify these memory circuits enabling a continual correction as the image edge positions vary on the screen. The two output memory signals are then averaged, and the average value compared to a fixed signal, representing the position of the screen center, to determine the actual heading in azimuth as compared with the desired heading, and any error derived therefrom is employed to control the aircraft autopilot. Concurrently both memory output signals comprise the aforementioned feedback to control the positions of the related tracking pulses on the horizontal scan lines, enabling these pulses to follow the positions of the left and right target image edges on the screen.

Elevation Intelligence Channel (FIG. 2)

The elevation intelligence channel comprising a plurality of units in the center and lower right of FIG. 2 enclosed within a dotted line 202, is substantially similar in circuitry and operation to the azimuth intelligence channel 201. Elevation tracking pulses corresponding to the predicted screen position of the target image top edge 32 are generated over line 207, and elevation tracking pulses corresponding to the predicted screen position of the target image bottom edge 33 are generated over line 208. Upper and lower elevation coincidence units 79 and 80 respond to these pulses, and the concurrently received Vidicon signals over common output line 205 to generate time coincidence error signals in response to the out of time phase reception of these input signals. Upper and lower elevation memory units 81 and 82 at the lower right, in a manner similar to the azimuth memory units 68 and 69, effectively integrate these coincidence error signals to provide continuous electrical potentials whose magnitudes are proportional to the top and bottom target edge image positions on the screen, which potentials are thereupon averaged by resistor 83 to derive, when compared with a fixed potential representing the screen center, the elevation direction control energizing the autopilot. Memory potentials from the upper and lower memory units 81 and 82 are further fed back over lines 73 and 74 to the elevation tracking pulse generators 53 and 54 respectively varying the time of elevation tracking pulse generation to enable coincidence between tracking pulses and Vidicon output.

The two elevation tracking pulses corresponding to the predicted screen positions where the top target edge image 32 and bottom target edge image 33 cut the screen bisecting vertical line 30, are generated by units 53 and 54 in response to the saw-tooth voltage energizing the vertical deflection coils of the Vidicon tube, or more precisely in the present embodiment by a sawtooth voltage derived from a current voltage converting amplifier represented by a block 50 located beneath the Vidicon 57 in a manner similar to that employed to energize the azimuth tracking pulse generators. However, this saw-tooth voltage during the second scanning pattern is derived from the horizontal sweep generator as discussed above, which simultaneously energizes the Vidicon vertical deflection coil to sweep the screen adjacent the screen bisecting vertical line 30 with a plurality of scan lines as shown by FIG. 1C. Thus for each vertical line scanning the screen during the second scanning pattern of each cycle two tracking pulses are generated, one by unit 53 and the other by unit 54, the position of the pulse generated by upper tracking unit 53 on each line is determined by the value of a feedback signal on line 73, and the position of the pulse generated by lower tracking unit 54 on each line is determined by the value of a feedback signal on line 74. These elevation tracking pulses are subsequently conveyed to gate circuits 75 and 76 which pass or prevent passage of these pulses in response to a control signal over line 1104. Gates 75 and 76 are provided to enable tracking pulse passage only during this second scanning pattern, for it is only during this second scanning pattern that the beam is swept across the screen face transversely to the target top and bottom edges and hence may the positions of these top and bottom edges be accurately tracked. Gate control voltage on 1104, therefore is generated by a timing circuit including delay multivibrator DMV "B" represented by a block labeled 77 at the lower position of the figure, which at a given time in each scanning cycle is flipped to its unstable position enabling upper and lower elevation gates 75 and 76 to open allowing the top and bottom tracking pulses to pass therethrough for time coincidence comparison with the Vidicon output signals. The timing circuits controlling DMV "B" 77 to flip over at the desired time in each scanning cycle are more fully shown by the enlarged block diagram of FIG. 11, and the detailed circuit schematic of FIG. 11A. A discussion of these circuits, although presently deferred at this point for simplicity will be made later on in connection with these circuit diagrams.

Referring again to the system timing diagram of FIG. 3 for an understanding of the time sequence of the above events taking place in the elevation intelligence channel, top edge tracking pulses, as illustrated, are generated at times $T_{323}$, $T_{326}$ and $T_{329}$ during each cycle and bottom edge tracking pulses as illustrated by curves are generated at times $T_{324}$, $T_{327}$ and $T_{330}$ during each cycle. DMV "B" is triggered by its associated timing circuits (FIG. 11) to flip over to its unstable state at time $T_{322}$ thereby enabling top and bottom edge tracking pulses to pass through their related gates for comparison with the Vidicon signals. The Vidicon output generated during this vertical line scanning of the screen face is illustrated by the curve labeled "TV output", and these signals are differentiated, and inverted to unidirectional pulses. Vidicon signals generated at approximately times $T_{323}$, $T_{326}$ and $T_{329}$ representing the top edge of the target image are thereupon compared in time coincidence with the top edge tracking pulses to derive an incremental coincidence error illustrated by the curve labeled top edge coincidence as shown by the connecting arrowed lines, and Vidicon signals generated at approximately times $T_{324}$, $T_{327}$ and $T_{330}$ representing the bottom edge of the target image are thereupon compared in time coincidence with the bottom edge tracking pulses to derive an incremental coincidence error illustrated by the curve labeled bottom edge coincidence as shown by the connecting arrowed lines. Subsequently these incremental coincidence errors are directed to modify the top and bottom memory voltages illustrated by the curves labeled top edge memory and bottom edge memory respectively thereby enabling these memory voltages to vary with the positions of the top and bottom target edge images during the flight path. An averaging resistor 83 is connected across the output of the top and bottom memory units in the elevation channel and the voltage derived from the center tap of this resistor indicates the elevation heading of the aircraft. Top and bottom memory output voltages are further directed in feedback to the top and bottom elevation tracking generators 53 and 54 respectively to control the time at which tracking pulses are generated thereby enabling the positions of these pulses to automatically follow the target top and bottom image edge positions on the screen.

SUMMARY

Determination of the azimuth heading of the missile with respect to the target is performed by tracking the Vidicon screen positions receiving the target image left and right outside edges, and measuring the amount these edges are received "off centered" from the Vidicon screen center, while determination of the elevation heading of the missile with respect to the target is performed by tracking the Vidicon screen positions receiving the target image top and bottom outside edges and measuring the amount that these edges are received "off centered" from the Vidicon screen center. In the preferred system these operations are separately and independently performed in sequential succession during each cycle, the azimuth missile heading being determined during a first interval in each cycle while the elevation intelligence system is disabled, and the elevation missile heading being determined during a second interval in each cycle, occurring at the end of the first interval, while the azimuth intelligence system is disabled. During this first interval of each cycle the Vidicon screen is scanned by a plurality of horizontal lines adjacent a fixed horizontal line bisecting the Vidicon screen while simultaneously with the generation of each horizontal line two azimuth tracking pulses are generated at predicted positions receiving the target left and right outside edges. Vidicon electrical output signals representing the left and right target image outside edges are subsequently compared with the related tracking pulses to derive left and right edge time coincident errors, which errors are thereupon integrated by two elevation memory circuits to derive feedback signals to vary the positions of the tracking pulses for enabling these pulses to effectively follow the screen positions of the left and right target image edges during the flight path. An averaging means computes the "off center" positions of these left and right tracked edges to provide correction signals for the missile autopilot enabling a correct course in azimuth to be flown. Upon the cessation of this first interval in each cycle, the screen bombarding cathode ray beam is repositioned and during the second interval of each cycle scans the screen with a plurality of vertical lines adjacent a fixed vertical line bisecting the Vidicon screen. Simultaneously with each vertical scan line two elevation tracking pulses are generated at predicted screen positions receiving the target image top and bottom edges. Vidicon electrical output signals resulting from this vertical line scanning raster and representing the top and bottom target image outside edges are compared with the related elevation tracking pulses to derive top and bottom edges time coincident errors which are thereupon integrated by two elevation memory circuits to derive feedback signals for varying the positions of the elevation tracking pulses enabling these pulses to effectively follow the screen positions receiving the top and bottom target edges during the flight path. An averaging means thereafter responds to these top and bottom feedback voltages to compute the "off center" positions of the top and bottom tracked edges to provide correction signals for the missile autopilot enabling a correct course in elevation to be flown.

As a further refinement of the general system enabling the discrimination of both a dark target against a light background or a light target against a dark background, the Vidicon output signals resulting from the scanned Vidicon screen are initially differentiated and thereafter inverted to provide a series of unidirectional pulses representing abrupt changes in the light received by adjoining areas on the screen face thereby providing electrical target indication dependent upon the light contrast between target and background and not the intensity of received light from the target alone.

In the event the reflected target image is momentarily prevented from reaching the Vidicon light sensitive screen because of atmospheric conditions i.e. clouds, rain etc. or artificial obstacles, provision is made to enable the continuous tracking of the target by employing the prior rate of change of the positions of the four target edges, to continuously position the left and right edge tracking pulses in the azimuth intelligence channel, and the top and bottom edge tracking pulses in the elevation intelligence channel to follow predicted changes in position of the target image edges. By this prediction process the missile does not lose "sight" of the target during light interruption intervals provided these intervals are not too extended. A complete discussion of this prediction process is given in connection with the memory circuits shown by FIG. 10.

Figure 4:
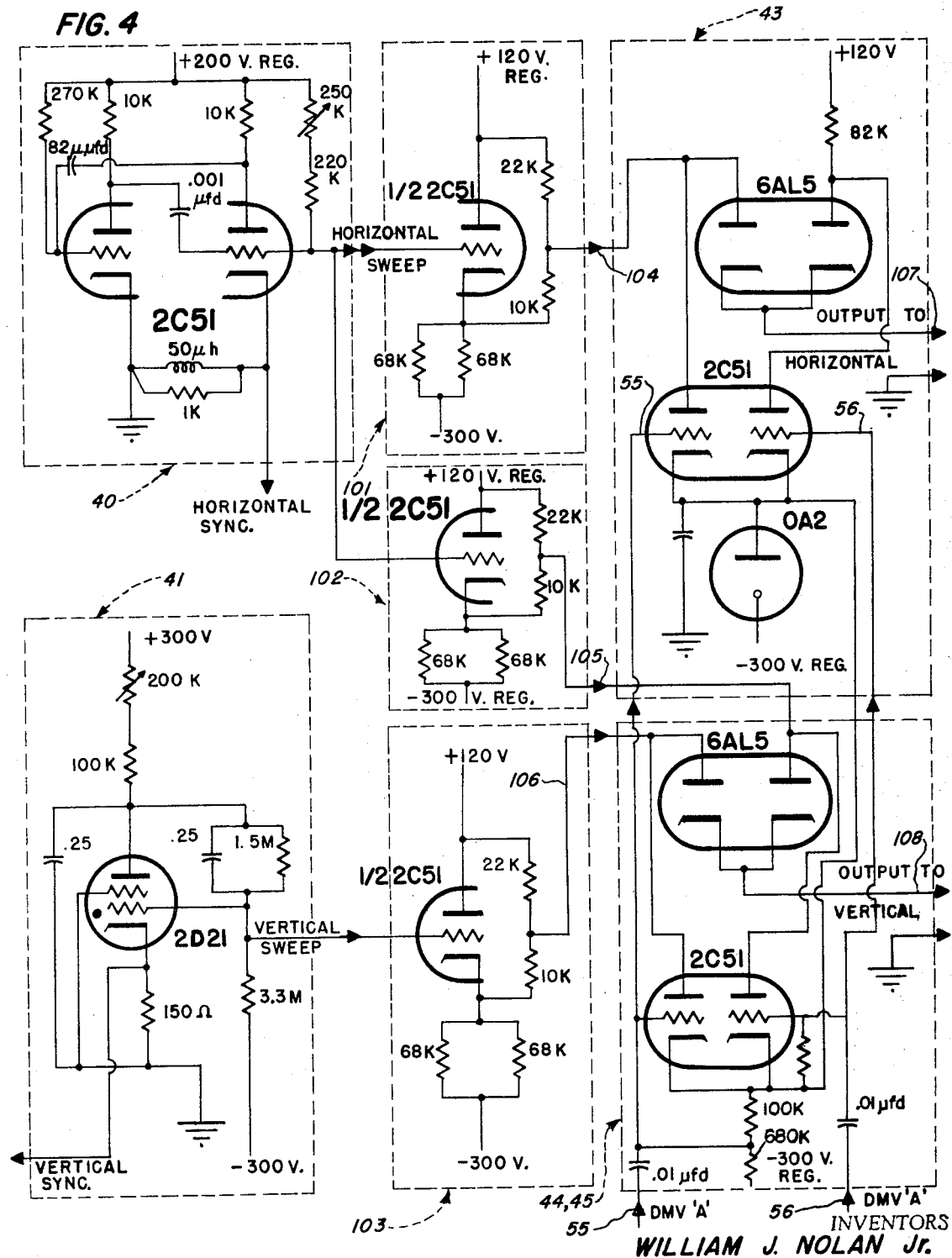
FIG. 4 is a schematic diagram of a horizontal sweep generator, a vertical sweep generator, and sweep generator gate circuits.

Sweep Generator and Gate Circuits (FIG. 4)

The proposed horizontal and vertical sweep generators constitute the basic scanning and timing units in the overall intelligence system. Their voltage values at any particular instant determine the position of the scanning beam on the light sensitive screen while simultaneously, by means of their control over the delay single stability state multivibrators, they control the tracking of the target edges in both azimuth and elevation. Accordingly therefore, these devices should be stable, accurate, and adapted to generate substantially linear saw-tooth voltage waveforms.

Referring now to FIG. 4 for a detailed schematic diagram of one preferred embodiment of the horizontal sweep generator 40, the vertical sweep generator 41, and the three gate circuits 43, 44 and 45 interconnecting the sweep generators and the horizontal and vertical magnetic coil deflection amplifiers 46 and 47 as shown by the system block diagram of FIG. 2, the horizontal sweep generator circuit, enclosed within a dotted line designated 40 at the upper left of the figure, comprises an unsymmetrical free running multivibrator employing two triodes, which may constitute adjacent halves of a duo-triode type 2C51 as shown. Plate-grid coupling of these adjacent tubes through different value capacitances of 82 micromicrofarads and 0.001 microfarads provides the necessary feedback to sustain oscillation and further provides the varying capacitor resistor time constants for unsymmetrical operation as desired. This basically conventional circuit is modified by the addition of resistors connecting the 200 volt regulated power supply to the control grid of each tube, enabling the feedback condensers to linearly charge during successive half cycles, and by an inductor resistor parallel circuit connecting the right hand cathode to ground enabling this network to differentiate the signal passing therethrough, thereby providing a linear saw-tooth voltage at the right hand tube control grid, and a horizontal sync pulse at the right hand tube cathode.

Below the horizontal sweep generator and enclosed by a dotted line generally designated 41 is the slower speed vertical sweep generator comprising a gas tube connected relaxation oscillator. This oscillator is conventionally designed including a gas tube type 2D21 plate energized by a 300 volt regulated source through a series resistor connection of 200k and fixed 100k ohms. A 0.25 microfarad capacitor connects the plate to cathode, and a resistor capacitor feedback parallel connection of 0.25 microfarads and 1.5M ohms is interposed in circuit between the tube plate and control grid, the latter being biased by a −300 volt regulated source through a 3.3M resistor. In operation, the 0.25 microfarad capacitor across the tube plate to cathode charges up through the 200k ohm variable and 100k ohm fixed series connected resistors until the plate voltage is sufficiently positive to ionize the gas tube and permit conduction therethrough. Upon ionization, this condenser discharges through the tube eventually lowering the plate voltage to a value where ionization ceases, thereby completing the cycle for the generation of a saw-tooth voltage and enabling the capacitor charging for a new cycle to begin. As well known to the art, the frequency and linearity of the resultant saw-tooth wave is determined by the selected tube characteristics and the given circuit values, however the addition of the parallel 0.25 microfarad, 1.5M resistor circuit connecting the tube plate to control grid further enables a higher degree of linearity to be achieved providing a substantially true saw-tooth wave at the grid connected circuit output and a vertical sync pulse at the cathode output as shown.

On the far right of the fig. enclosed within two vertically aligned dotted boxes generally designated 43 and 44, 45 respectively are schematic diagrams of a preferred embodiment of the sweep circuit connecting gates functionally described in the system block diagram of FIG. 2. Briefly reiterating the function of these gates throughout the two phases of the scanning cycle; during the first phase of the scanning cycle (positive going portion of the vertical sweep 41) gates 43 and 45 are opened in response to the delay multivibrator signal DMV "A" over line 55 to thereby enable the horizontal and vertical sweep voltages to pass therethrough, while gate 44 is closed in response to the separate delay multivibrator DMV "A" voltage on line 56. During the second phase of the scanning cycle (return of the vertical sweep saw-tooth wave, conventionally termed the "flyback" time) gate 44 in response to a new voltage value generated over control line 56 by delay multivibrator DMV "A" 42 in its unstable position, is opened passing the horizontal sweep voltage to the vertical Vidicon deflection amplifier 47, while gates 43 and 45 are closed in response to new voltage value generated over control line 55 by DMV "A". Referring now specifically to the circuit enclosed by dotted line 43 in the upper right of the fig. constituting the first horizontal sweep gate, four tubes including two diodes preferably dual halves of a type 6AL5, and two triodes preferably dual halves of a type 2C51 are aligned by connecting each of the diode plates to a separate one of the triode plates and energizing the right hand connected plates from a 120 volt regulated source through an 82k ohm resistor. The triode cathode elements are commonly connected and biased by a −300 volt regulated source through a voltage regulator tube preferably type OA2 in parallel with two series connected resistors of 100k and 680k shown at the lower part of the fig., while being alternating current bypassed to ground through a suitable value capacitor. A gate controlling voltage derived from delay multivibrator DMV "A" over line 55 energizes the control grid of the left hand triode through an 0.01 microfarad coupling capacitor while a separate gate controlling voltage from delay multivibrator DMV "A" over line 56 energizes the control grid of the right hand triode through a .01 microfarad coupling capacitor. The circuit enclosed by a dotted line designated 44 and 45 in the lower right of the fig. constituting the combined second horizontal sweep gate 44 and first vertical sweep 45 gate comprises an arrangement of tubes and components substantially similar to that of the first horizontal sweep gate 43, however, the lower right hand diode is plate energized by a variable signal over line 105 originally derived from the horizontal sweep generator 40 instead of from a fixed regulated voltage source of 120 volts as shown by the circuit of gate 43.

Considering now the joint operation of both circuits 43 and 44, 45 respectively in passing or preventing the passage of the horizontal and vertical sweep voltages in response to the gate controlling signals over lines 55 and 56; the horizontal sweep voltage is introduced over input lines 104 and 105 and the vertical sweep voltage over input line 106. During the first pattern of the scanning cycle DMV "A" is in its stable position whereby the voltage on gate control line 55 is more negative and the voltage on gate control line 56 is oppositely more positive enabling the left hand triodes in both upper gate 43 and lower gate 44, 45 to cut off, and the right hand triodes in the upper and lower gate to conduct. With this condition existing the horizontal sweep voltage introduced over input line 104 passes through the left hand diode in the upper gate 43 to the horizontal output path designated 107. Simultaneously the vertical sweep voltage introduced over input line 106 passes through the left hand diode in the lower gate 44, 45 to the vertical output path 108. However the conducting condition of the right hand triodes in both gates effectively short out or by-pass the right hand diodes preventing the 120 volts regulated source in the upper gate 43 from passing through the upper right hand diode to the output path 107 and preventing the horizontal sweep voltage on input line 105 from passing through the lower right hand diode to the vertical output path 108. Thus during this first scanning pattern, gate 43 passes the horizontal sweep voltage to the horizontal output 107 and gate 45 passes the vertical sweep voltage to the vertical output 108. Upon the initiation of the second pattern of the scanning cycle, DMV "A" is triggered to its unstable position whereby the voltage on lines 55 and 56 are reversed, line 55 becoming more positive and line 56 more negative enabling the left hand triodes in both upper gate 43 and lower gate 44, 45 to conduct, and the right hand triodes in the upper and lower gates to cut off. Conduction of the left hand triode in the upper gate 43 by-passes the horizontal sweep signal from input line 104 through the triode plate to cathode to ground preventing this signal from reaching the horizontal output path 107. Similarly the left hand triode in the lower gate prevents the vertical sweep signal 106 from reaching the vertical output path 108. However cut off condition of the right hand triodes in the upper and lower gates enables the passage of a fixed signal from the 120 volt regulated source in upper gate 43 through the 82k ohm resistor and upper right hand diode to the horizontal output path 107, and in the lower gate 44 enables the horizontal sweep voltage on line 105 to pass through the lower right hand diode to the vertical output path 108. Thus during the second pattern a fixed positive voltage is passed through the upper gate 43 to the horizontal deflection circuits while the horizontal sweep signal is passed through the lower gate 44, 45 to the vertical deflection circuits.

The remaining three circuits shown in vertical alignment in the central portion of FIG. 4, each enclosed by dotted lines designed successively from top to bottom 101, 102, and 103 comprise identical single triode tube circuits adapted to raise the direct current level of a voltage conducted to their inputs while maintaining the input waveform unchanged. Each of these circuits comprises a single triode preferably one half of a duo-triode type 2C51 plate energized from 120 volt regulated source, cathode energized from a −300 volt regulated source through two parallel connected resistors of 68k ohms, and having two series connected resistors of 22k ohms and 10k ohms connected from plate to cathode. When the control grid is energized from the junction of the series connected resistors whose waveform is identical with the energizing voltage but whose direct current level is raised therefrom. This function is enabled due to the potentiometric arrangement of the series and parallel connected resistors acting in conjunction with the grid energized variable impedance tube. As shown by the fig. circuits 101 and 102 are commonly energized from the horizontal sweep generator 40 and are adapted to generate output voltages on lines 104 and 105 respectively having a raised D-C level horizontal sweep voltage, while circuit 103 is control grid energized by the vertical sweep generator 41 and adapted to energize line 106 with a raised D-C level vertical sweep voltage, all the above raised D-C level voltages enabling the horizontal and vertical scan circuits to operate in accordance with the predetermined values required by the Vidicon deflection coil design.

Figure 5:
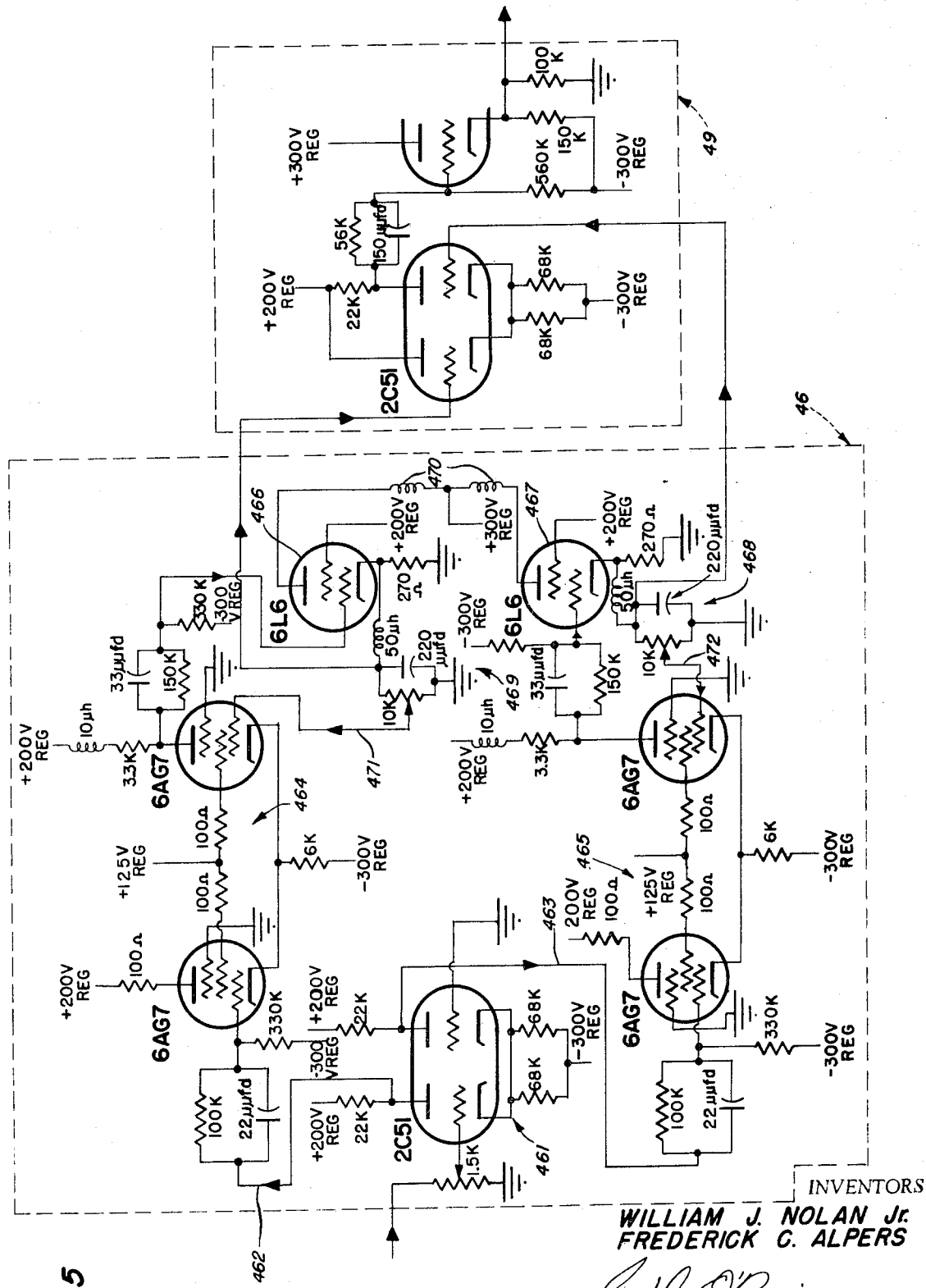
FIG. 5 is a schematic diagram of a horizontal voltage current converter circuit.

Vidicon Deflection Amplifier and Converting Amplifier (FIG. 5)

The proposed horizontal deflection amplifier 46 and vertical deflection amplifier 47, shown in block form in FIG. 2 interconnecting the sweep generator controlling gates 43, 44, and 45 with the Vidicon horizontal magnetic deflection coil and vertical magnetic deflection coil respectively, comprise identical circuits each adapted to generate a linear push-pull saw-tooth current in response to, and in phase with, a single ended energizing linear saw-tooth voltage generated by the sweep generators. These devices are employed to provide a uniform deflection of the Vidicon scanning beam with time during both patterns of the scanning cycle thereby enabling the linear scanning of the Vidicon screen for allowing the positions of the target edges upon the Vidicon screen to be accurately compared. This voltage current conversion is desired in the present system because the Vidicon magnetic deflection coils are inherently nonlinear impedances whereby their energization by a linear saw-tooth voltage fails to provide a linear saw-tooth energizing current for enabling a uniform deflection of the Vidicon beam with time.

The proposed horizontal current voltage converting amplifier 49 and the vertical current voltage converting amplifier 50 shown in block form in FIG. 2 interconnecting the output of the deflection amplifiers 46 and 47 with the azimuth and elevation tracking pulse generators 51, 52 and 53, 54 respectively, comprise identical circuits each adapted to generate a linear saw-tooth voltage in response to and in phase with a double ended energizing linear saw-tooth current. These devices are employed to reconvert the push-pull saw-tooth current energizing the Vidicon magnetic deflection coils back to an in phase saw-tooth voltage enabling the generation of tracking pulses at a time in synchronism with a given position of the scanning sweep.

Referring now to FIG. 5 for a detailed schematic diagram of a preferred embodiment of the horizontal deflection amplifier enclosed within a dotted line 46, and the horizontal current voltage converting amplifier enclosed within a dotted line 49, deflection amplifier 46 at the left portion of the Fig. comprises eight vacuum tubes divided into two push-pull channels for energizing the Vidicon horizontal magnetic deflection coil (designated 470 at the right center of the Fig.). The two input tubes generally designated 461 at the left of the Fig. comprise triodes preferably dual halves of type 2C51 having their plates separately energized by 200 volt regulated power supply through equal value resistors of 22k ohms, and their commonly connected cathodes energized by a minus 300 volt regulated power supply through two parallel connected resistors of 68k ohms. An input voltage signal energizes a variable potentiometer of 1.5k ohms whose center tap is connected to the left hand input tube control grid, and the right hand input tube control grid is grounded. Output signals are taken from the two plates over lines 462 and 463 and conveyed in the upper channel to the input of differentially arranged pentodes generally designated 464 through a resistor capacitor parallel series coupling network comprising a parallel connection of 100k ohm resistor with a 22 micromicrofarad capacitor all in series with a 330k ohm resistor to a minus 300 volt supply to ground, and conveyed in the lower channel to the input of identical differentially arranged pentodes generally designated 465 through an identical resistor capacitor parallel series coupling network. The common cathode connection of the two input triodes through parallel connected feedback resistors permits these tubes to function differentially in response to a single input signal, enabling their joint operation as a 180° phase splitter whereby a single input energizing signal is converted into two symmetrical linearly amplified signals, one of which is in phase with the input energizing signal (line 463) and the other 180° out of phase with the energizing signal (line 462). Differentially connected pentodes 464 in the upper push-pull channel comprise twin vacuum tubes preferably type 6AG7 interconnected as a differencing circuit to compare two voltage signals conveyed to their respective control grids and generate an output voltage proportional to the difference of these two input signals. The left hand tube of the pair is plate energized by a 200 volt regulated source through a 100 ohm resistor, has its suppressor grid grounded, its screen grid energized by a 125 volt regulated source through a 100 ohm resistor, its control grid energized by one of the phase splitted and amplified input signals over line 462 through a resistor capacitor coupling network, and its cathode energized by a minus 300 volt regulated source through a 6k ohm feedback resistor; while the right hand tube of the pair is plate energized by a 200 volt regulated source through a 10 microhenry coil in series with a 3.3k ohm resistor, has its suppressor grid grounded, its screen grid energized by a 125 volt regulated source through a 100 ohm resistor, its control grid energized by a feedback signal over line 471, and its cathode energized in common with the left hand pentode through the 6k ohm cathode feedback resistor. As the control grid of the left hand pentode of this twin tube pair is positively energized, a current flows through this tube and 6k ohm cathode feedback resistor, causing a positive feedback voltage drop thereacross. The magnitude of this cathode feedback voltage is proportional to the grid signal however its polarity tends to decrease the current flow through the right hand pentode. If, however, the control grid of the right hand pentode should be simultaneously energized by a positive signal having the tendency to increase the plate cathode current flow therethrough, the resulting plate to cathode current flow through this right hand tube is dependent upon the two opposing voltages and therefore is proportional to the difference of these two voltages. As the output of this twin pentode circuit is taken from the plate of the right hand tube, this output voltage is also proportional to the difference of the signals energizing the two control grids, namely the signal over line 462 and that over line 471. Twin pentodes generally designated 465 in the lower push-pull channel constitute an identically operating device for generating an output voltage proportional to the difference of the input signals on lines 463 and 472, however all of these signals are displaced 180 electrical degrees from those of the upper push-pull channel. The remainder of this circuit comprises two output beam power amplifier pentodes 466 and 467 both preferably type 6L6, aligned in the upper and lower channels respectively, and arranged to be grid energized by the upper and lower channel differencing signals through identical capacitor resistor coupling networks comprising a parallel connection of a 33 micromicrofarad capacitor and a 150k ohm resistor all in series with a 300k ohm resistor to a minus 300 volt regulated supply. These tubes are adapted to energize the horizontal Vidicon deflection coil 470 in push-pull with a true linear saw-tooth current wave and accordingly their plates are connected to opposite ends of this coil whose center tap is energized by a 300 volt regulated supply. In the cathode circuits of these push-pull arranged output pentodes are interposed specially designed inductor capacitor T networks generally designated 468 and 469, each comprising a 50 microhenry inductor in series with parallel connected 220 micromicrofarad condenser and 10k ohm potentiometer all between the cathode and ground. These networks are adjusted to be the electrical dual of the Vidicon deflection coil equivalent circuit. A voltage derived from the variable output tap of these 10k ohm network potentiometers is conveyed to the control grid of the right hand differencing pentode in the related push-pull channel, which voltage constitutes the channel feedback control shown by lines designated 471 and 472. Thus, the voltages energizing the control grids of the power output tubes 466 and 467 comprise signals proportional to the difference of the 180° phase splitted input saw-tooth energizing voltages and the feedback voltages derived from the cathodes networks 468 and 469. However, as the true saw-tooth current energizing the Vidicon deflection coil section in each of the push-pull channels all passes through the related 6L6 output tube and 270 ohm cathode resistor to ground thereby constituting a saw-tooth voltage input to the feedback networks, the feedback voltages on lines 471 and 472 are proportional to the electrical dual of the voltage appearing across the Vidicon deflection coil thus enabling the generation of true push-pull saw-tooth currents through the Vidicon deflection coil in phase with the sweep voltages.

The horizontal current-voltage converting amplifier at the right portion of FIG. 5, enclosed within a dotted line designated 49, comprises a three tube circuit responsive to push-pull signals generated by the horizontal deflection amplifier 46 for reconverting these push-pull signals to a single ended in phase saw-tooth timing voltage suitable for energizing the automatic tracking circuits in the azimuth intelligence channel 201. The first two tubes of this circuit comprise two triodes preferably dual halves of type 2C51 connected as a differencing circuit having their cathodes commonly energized by a minus 300 volt regulated power supply through two parallel connected resistors of 68k ohms; the left plate energized directly by a 200 volt regulated power supply, and the right plate energized by a 200 volt regulated power supply through a 22k ohm resistor. A single difference voltage is taken from the plate of the right tube and conveyed to the control grid of the following cathode follower connected circuit output tube through a coupling network comprising a parallel connected 56k ohm resistor and a 150 micromicrofarad condenser all in series with a 560k ohm resistor to a minus 300 volt regulated power supply. The cathode follower connected output tube comprises a triode, direct plate energized by a 300 volt regulated source and cathode energized by a minus 300 volt regulated power supply through a large 150k ohm resistor and shunted by a 100k ohm output impedance matching resistor to ground. Two input energizing push-pull voltages are derived from across the 10k ohm potentiometers, constituting the 180° displaced outputs of the dual feedback networks 468 and 469 in the horizontal deflection amplifier 46, and conveyed to the opposite control grids of the converting amplifier 49 input. These voltages are recombined by this differencing circuit to yield a single phase voltage which is thereupon impedance matched to the succeeding azimuth tracking channel by means of the triode cathode follower output circuit to provide the desired azimuth saw-tooth timing voltage.

Although this saw-tooth timing voltage may be derived directly from the input to horizontal deflection amplifier 46, a separate converting circuit of the above type is desired for providing greater flexibility of design.

Figure 6:
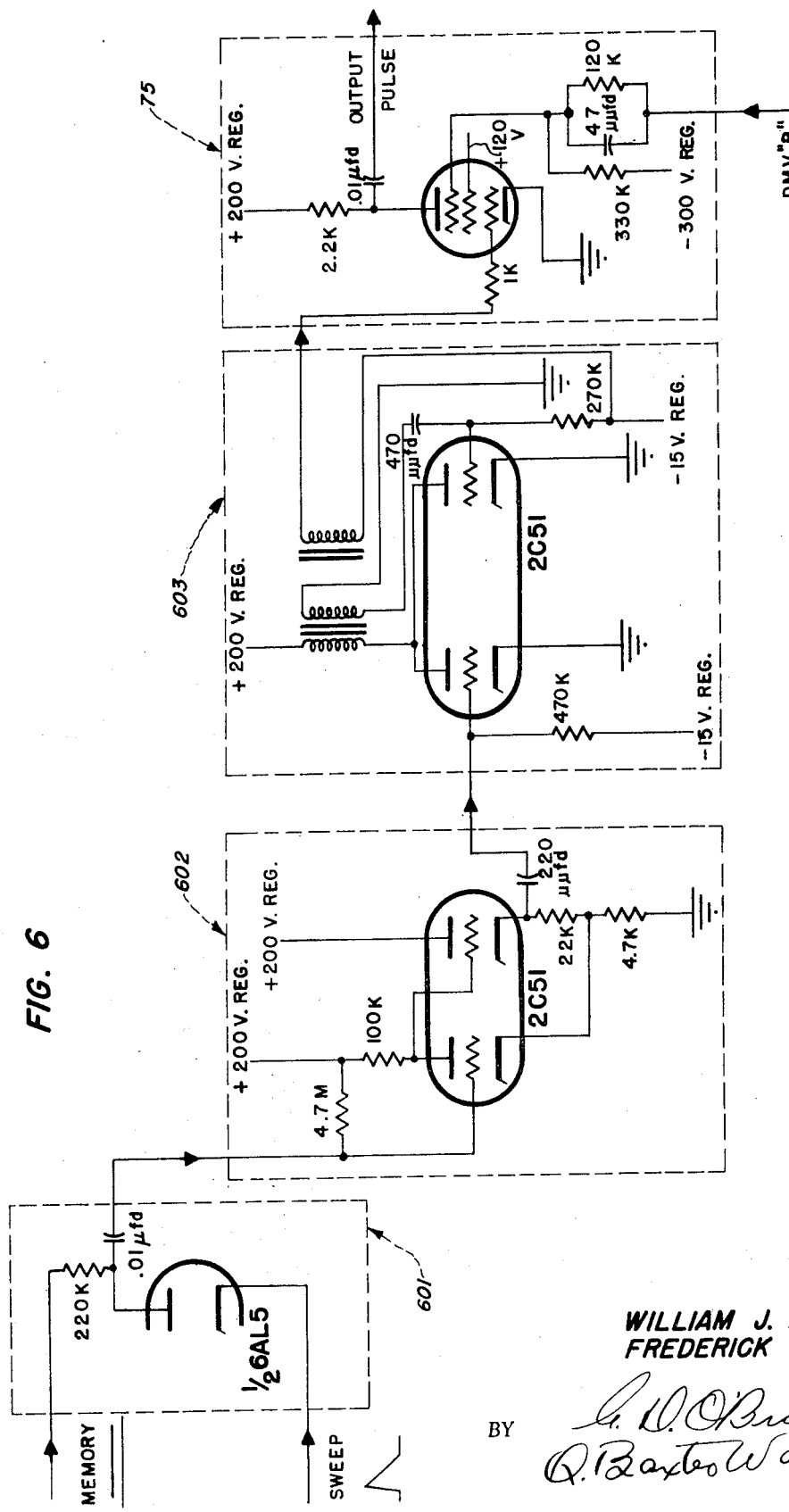
FIG. 6 is a schematic diagram of a tracking pulse generator and tracking gate circuit.

Tracking Pulse Generator and Tracking Gate Circuits (FIG. 6)

The proposed automatic tracking pulse generators 51, 52, and 53, 54, represented by blocks in the azimuth intelligence channel 201 and the elevation intelligence channel 202 respectively of the FIG. 2 system block diagram, comprise four substantially identical circuits adapted to respond to a linear saw-tooth input timing voltage and generate a fixed wave form pulse at the instant this timing voltage reaches a preselected value. This preselected value or time at which the fixed wave form pulse is generated is determined by the value of a separate feedback memory voltage conveyed to the circuit over a separate input. As all four of these devices are substantially identical differing only in the time of generating output tracking pulses, the preferred circuitry employed in each may be illustrated by the FIG. 6 schematic diagram of one embodiment. Referring now to FIG. 6, the overall tracking pulse generator circuits may be divided into three separately functioning units in cascade connection, each of these units enclosed by a dotted box designated in succession across the fig. from left to right 601, 602, and 603. Unit one designated 601 comprises a diode pick off circuit employing a diode vacuum tube preferably one half of a duo-diode type 6AL5, having its cathode directly energized by the reversed linear saw-tooth timing voltage whose wave form is illustrated adjacent the input line (labeled sweep), and its plate energized by the positive memory feedback voltage through a 220k resistor. As a diode conducts only when its plate voltage is more positive than its cathode voltage and the maximum value of the reversed saw-tooth voltage energizing the cathode of this tube is generally greater than the memory feedback voltage, this tube is initially non-conducting. Thereafter the reversed saw-tooth cathode voltage decreases uniformly with time and after the passage of a given interval this voltage reaches a value equal to and subsequently more negative than the positive memory voltage energizing the plate, whereupon the diode conducts. Upon conduction a current commences to flow through the 220k ohm plate resistor and the voltage drop resulting from this abrupt current flow rapidly lowers the diode plate potential generating a negative pulse. This negative pulse, generated at the instant the reversed saw-tooth timing voltages falls below the value of positive memory feedback voltage, is conveyed to succeeding unit two, (602) through a 0.01 microfarad coupling condenser. Unit two comprises an amplifying, inverting, and pulse sharpening circuit including two triode vacuum tubes preferably due halves of type 2C51 connected as a sharp cutoff feedback amplifier. Left hand tube of this pair is plate energized by a 200 volt regulated source through a 100k resistor, control grid energized by both the negative output pulse from the diode pick off unit 601 and from the 200 volt regulated source through a 4.7M ohm biasing resistor, and cathode energized by a feedback signal from the junction of two series connected resistors of 22k ohms and 4.7k ohms connecting the right hand tube cathode to ground. Right hand triode of this pair is direct plate energized by a 200 volt regulated power supply, and control grid energized directly from the left hand tube plate. A negative signal to the control grid of the left hand tube from the diode pick off unit 601 decreases the current flow through this tube raising its plate potential. Simultaneously this increased positive plate potential is conveyed to the control grid of the right hand triode increasing the current flow therethrough and causing a more positive voltage drop across the feedback series connected 22k ohm and 4.7k ohm resistors in the cathode circuit. This more positive feedback is then conveyed back to the left hand tube cathode sharply decreasing current flow through this tube whereupon the cycle is repeated substantially simultaneously resulting in a flipping action of both tubes to cut off current through the left hand triode and pass large current through right hand triode. A 220 micromicrofarad coupling condenser conveys this large sharp edged positive signal appearing at the right hand triode to unit three (603) of the tracking pulse generator generally designated 603, which comprises a conventional blocking oscillator circuit adapted to generate a fixed wave form output in response to a large sharp edged input signal.

Thus the three units of the tracking pulse generator include initially a diode pick off adapted to generate a negative pulse at a variable time during each saw-tooth timing wave, the time of generation of this negative pulse controlled by the voltage value of a memory feedback potential; secondly a sharp cutoff feedback amplifier adapted to respond to the negative pulse, sharply amplify its voltage value, and invert its polarity; and thirdly a conventional blocking oscillator circuit adapted to be triggered by the sharp edged amplified pulse to provide constant wave form output tracking pulses in time coincidence with the negative pulse generated by the diode pick off unit.

Tracking Gate Circuit

The proposed tracking gate circuits represented by blocks 58 and 59 in the azimuth intelligence channel 201, and by blocks 75 and 76 in the elevation intelligence channel 202 of the FIG. 2 system block diagram, comprise four identical circuits connected to the outputs of the corresponding tracking pulse generators 51, 52, 53, and 54 respectively, each adapted to pass or prevent the passage of tracking pulses therethrough depending on the value of a single gate control potential; the two gates 58 and 59 in the azimuth intelligence channel opened and closed simultaneously in response to the voltage generated by delay multivibrator DMV "C" 60, and the two gates 75 and 76 in the elevation intelligence channel opened and closed simultaneously in response to the voltage generated by delay multivibrator DMV "B" 77. As all four of these devices are identical, the preferred circuitry employed in each is illustrated by the single circuit schematic of FIG. 6.

Referring to FIG. 6, the tracking gate circuit shown enclosed by a dotted line 75 at the far right of the fig., comprises a single pentode vacuum tube having its plate energized by a 200 volt regulated power supply through a 2.2k ohm resistor, its suppressor grid energized by a gate control voltage from DMV "B" through a 120k ohm and 47 micromicrofarad resistor-condenser parallel network and biased by a minus 300 volt regulated power supply through a 330k ohm resistor, its screen grid energized by a 120 volt regulated power supply, and its cathode grounded. Tracking pulses are conducted to the control grid of this tube through a 1k ohm resistor and output pulses are derived from the plate of this tube through a 0.01 microfarad coupling condenser. However, as well known to the art these output pulses can not be transmitted in response to the input unless the tube suppressor grid receives a proper control voltage from DMV "B" to permit operation, and therefore this single tube circuit functions as a gate in response to the DMV "B" control voltage.

Figure 7:
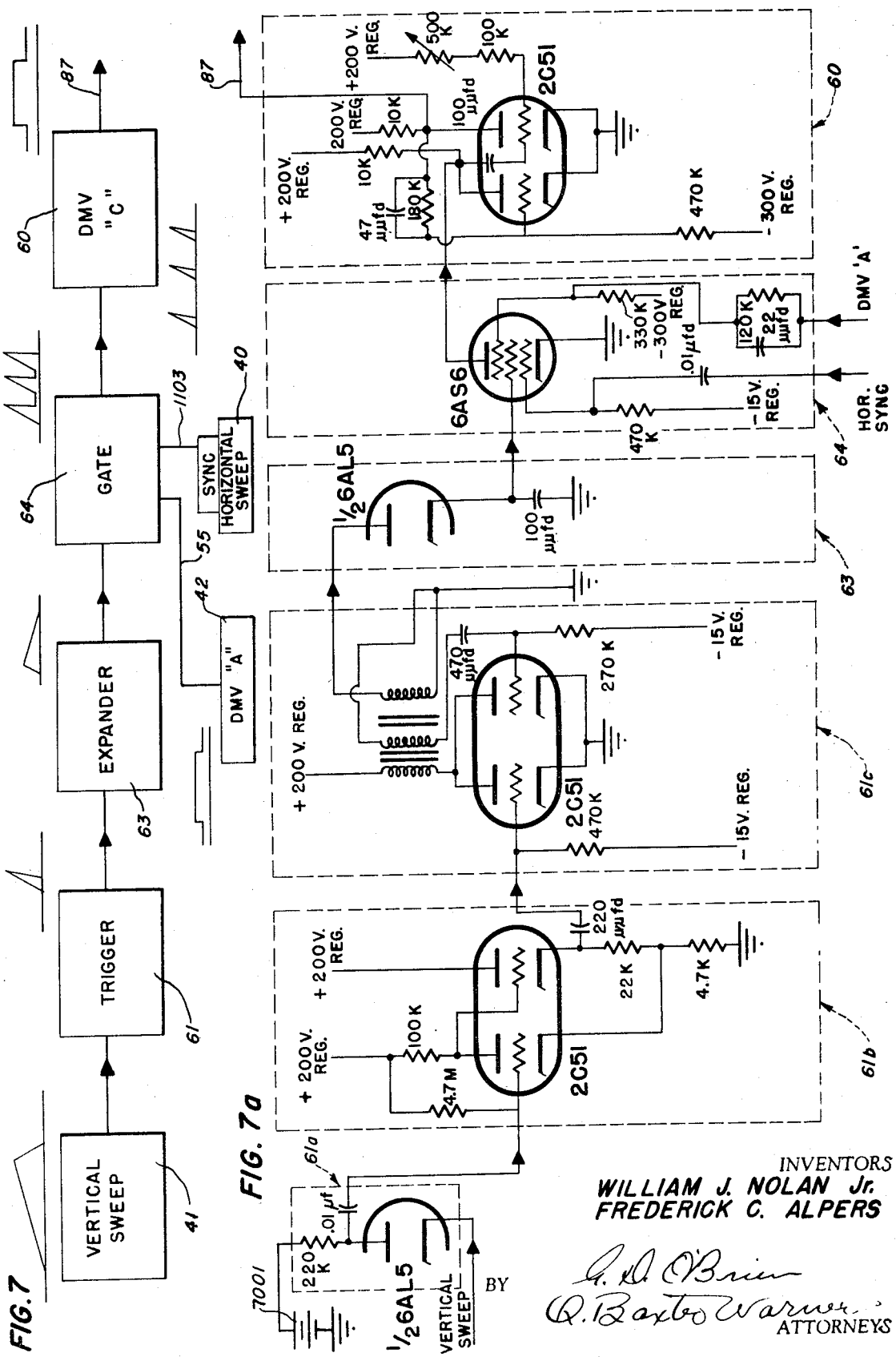
FIG. 7 is a block diagram of the circuits controlling the operation of azimuth tracking gates.

Delay Multivibrator DMV "C" and Associated Time Control Circuits (FIG. 7)

Delay multivibrator DMV C illustrated by a block 60 in the azimuth intelligence channel 201 of the FIG. 2 system block diagram comprises one of the three basic time sequence controlling units in the overall guidance system. Each of these time sequence controlling units DMV "A" 42, DMV "B" 77, and DMV "C" 60 is employed to control the operation of selected gating means for predetermined intervals enabling three basic functions within the system to be performed. The first basic function controlled by delay multivibrator DMV "A" provides for the division of each Vidicon screen scanning cycle into two patterns enabling desired electrical information to be more readily derived from the target optical image on the screen for automatic elevation and azimuth guidance control of the missile as discussed above. The second basic function controlled by delay multivibrator DMV "C" enables the automatic tracking of the left and right target edge images by controlling the time interval during which the left and right edge tracking pulses are passed for time coincident comparison with the Vidicon output signals representing these edges. And the third basic function controlled by delay multivibrator DMV "B" enables the automatic tracking of the top and bottom target edge images by controlling the time interval during which the top and bottom edge tracking pulses are passed for time coincident comparison with the Vidicon output signals representing these target edge images. Each of these delay multivibrator circuits are basically similar, being adapted to generate a fixed signal for a predetermined time interval after initiation by a negative pulse, which signal is employed to enable the operation of a given function for the predetermined interval. However, the individual times during which these delay multivibrators are initiated during each scanning cycle varies dependent upon the particular function being controlled, and accordingly three additional timing circuits are provided to initiate these time interval controllers.

At this point the disclosure is primarily directed to the second basic function controlled by delay multivibrator DMV "C" and its associated initiating circuits, which serves to control the azimuth tracking gates enabling the passage or preventing the passage of left and right edge tracking pulses for later comparison with the Vidicon signals representing these edges of the target image. In the overall functional description concerning the preferred mode of left and right edge tracking, it may be recalled that these edges of the target image are tracked only at the points where they cut the screen horizontal dividing line 31 thereby enabling irregularly shaped targets to be tracked in azimuth as readily as regularly shaped targets, such as building having parallel outside edges. Accordingly therefore, it is desired that tracking pulses be passed for this coincidence comparison only with the target image signals representing the portions of the target outside edges cutting the screen horizontal dividing line. However, as the left and right tracking pulse generators produce pulses for each horizontal scan line, it becomes necessary to select from these pulses those generated at the desired time or more specifically those generated as the Vidicon bombarding cathode ray beam is scanning the screen adjacent the screen horizontal dividing line 31. For this purpose then, delay multivibrator DMV "C" 60 is employed in conjunction with the tracking gates 58 and 59 in the azimuth channel, and it is supplied with time initiating circuits to insure its operation at the desired time in each scanning cycle.

Referring now to FIG. 7 for an enlarged block diagram of delay multivibrator DMV "C" and its associated time initiating circuits for controlling the interval during which the left and right edge tracking pulses are passed for coincidence comparison with the Vidicon electrical output signals representing these target edge images, DMV "C" is represented by a block designated 60 at the far right of the fig., the vertical saw-tooth generator 41 at the far left, delay multivibrator DMV "A" 42 at the center left and the horizontal saw-tooth generator 40 at the center right. Two circuits descriptively labeled trigger 61 and expander 63 are connected in cascaded alignment with the vertical sweep generator 41, and are responsive to the vertical saw-tooth voltage passing through a predetermined value to generate an exponentially decaying enabling voltage (shown by the wave form above the expander 63). A multiple signal responsive gate 64 is energized by the above-mentioned enabling voltage and the proper control signals from DMV "A" 42 over line 55 and the horizontal sync over line 1103, to generate an initiating voltage to DMV "C" 60 upon the coincident reception of all three selected control signals, thereby flipping over DMV "C" to its unstable position to provide a gate opening control voltage on DMV "C" output line 87.

Thus the time for initiating DMV "C" to commence its time interval control over the gating circuits in the azimuth channel 201, occurs at the instant determined by the coincidence of three selected value signals, and referring to the master timing chart of FIG. 3 it may be readily seen that DMV "C" is initiated at time $T_{160}$ during the first pattern of each scanning cycle as DMV "A" line 55 (the converse of DMV "A" line 56) is more positive, the vertical sweep voltage wave reaches a preselected value at time $T_{159}$, and the next succeeding horizontal sync signal is generated at time $T_{160}$ resulting in the three way coincidence sufficient to operate multiple gate 64.

The significance of these three signals is that (1) the DMV "A" signal on line 55 conditions the multiple gate only during the first scanning pattern of each cycle (FIG. 1B), thereby allowing DMV "C" to operate only during this first scanning pattern when the left and right outside edges of the target image are being scanned, (2) the selected value of the vertical sweep generator is operable to actuate the trigger and condition the multiple gate only when the cathode ray bombarding beam is positioned substantially adjacent the screen horizontal dividing line 31 thereby insuring that left and right tracking pulses generated while the scanning beam is sweeping above the screen dividing line 31 are not passed for coincident comparison with the Vidicon electrical target signals, and (3) the horizontal sync signal opens the multiple gate at the commencement of the next horizontal scan line after the two above-mentioned conditioning signals take place thereby enabling the succeeding left and right tracking pulses to be compared with the Vidicon electrical signals representing the left and right outside edges of the target image adjacent the screen horizontal dividing line 31 (FIG. 1B).

FIG. 7A shown below the block diagram of FIG. 7 is a detailed schematic of the preferred circuitry employed to perform the above-mentioned time initiating and time interval controlling functions, wherein the individual circuits are enclosed within dotted lines numbered to correspond with the similarly designated blocks of FIG. 7, with the exception of the trigger circuit 61 which is divided into three separate horizontally aligned units numbered successively 61A, 61B, and 61C.

Each of these three units of trigger 61 comprising a diode pickoff unit 61A, a pulse shaping and inverting unit 61B, and a blocking oscillator unit 61C, are substantially identical with units 601, 602, and 603 respectively shown and fully described in FIG. 6, and therefore for present purposes, it suffices to state that upon the vertical saw-tooth sweep signal conveyed to the cathode of the diode pickoff tube (61A) reaching a preselected value determined by the value of fixed voltage 7001 energizing the diode plate, a fixed wave form pulse is generated by blocking oscillator unit 61C to the succeeding expander circuit 63.

Expander circuit 63 comprises a unidirection condenser charging circuit employing a single diode vacuum tube preferably type 6AL5 in series with a 100 micromicrofarad condenser to ground. The fixed wave form positive pulse generated by blocking oscillator unit 61C is conveyed to this diode plate whereupon it passes through the diode and charges the capacitor. However, as the condenser may not discharge back through the diode, this charge is stored by the capacitor thereby maintaining a positive potential thereacross for a substantial period until dissipated by the condenser leakage resistance.

Multiple gate shown within dotted line 64 comprises a single pentode vacuum tube, preferably type 6AS6, having its cathode grounded, its screen grid energized by the voltage across the expander condenser, its control grid biased by a minus 15 volt regulated source and energized by a horizontal sync signal through a 0.01 microfarad condenser, its suppressor grid biased by a minus 300 volt regulated source and energized by the DMV "A" signal through a 120K ohm resistor shunted by a 22 micromicrofarad by-pass condenser, and its plate directly coupled to DMV "C" 60. Conduction through this tube is normally prevented by the action of the biasing sources, however, upon all three grids receiving selected value positive signals in coincidence, the tube conducts, enabling a negative pulse to energize DMV "C" 60. The remaining circuit, DMV "C", at the far right enclosed within a dotted line 60 comprises a single stability state flip-flop employing two triode vacuum tubes, preferably dual halves of type 2C51, having their cathodes commonly grounded and their plates individually energized by 200 volt regulated sources through separate 10K ohm resistors. The control grid of the right hand tube is biased by a 200 volt regulated source through series connected variable 500K ohm and fixed 100K ohm resistors, and energized by a signal from the left hand plate through a 100 micromicrofarad charging condenser, while the control grid of the left hand tube is biased by a minus 300 volt regulated source, and energized by a feedback signal from the right hand plate through a 180K ohm resistor shunted by a 47 micromicrofarad condenser. Normally, due to the positive voltage energizing the right hand tube control grid, this tube conducts whereas the left hand tube is cutoff because of the plate control grid feedback and negative bias. Conduction of the right hand tube presents a more negative potential on output line 87. However upon the reception of a negative pulse from multiple gate 64 to the control grid of this right hand tube, conduction is cut off whereupon the left hand tube is made conducting by the application of a positive feedback from the right hand plate. Nonconduction of the right hand tube now presents a more positive signal on output line 87. Thereafter DMV "C" remains in this latter unstable conducting condition for a predetermined interval enabling the azimuth tracking functions to be performed, and then it automatically flips back to its stable (right tube conducting, left tube cut off) condition due to the feedback component characteristics thereby lowering the voltage on control line 87 and closing the azimuth tracking gates.

From the master timing chart FIG. 3, it may be observed that the above events occur once during each scanning cycle during the first scanning pattern from time $T_{160}$ through time $T_{165}$.

Video Preamplifier Circuit (FIG. 8)

As the Vidicon photo-conductive screen is bombarded by the moving cathode ray beam being swept in lines across its face, adjacent screen portions receiving a bright light image and a dark light image respectively enable the generation of varying magnitude pulses as the beam passes from bright to dark, and as the beam passes from dark to bright areas. These pulses continuously generated during both scanning patterns are irregular in wave form, and have relatively low amplitudes. Accordingly, it is desired to convert all of these irregular pulses representing changes of light intensity on the screen to unidirectional, constant waveform, amplified pulses having sharp waveforms to enable a more precise comparison with the unidirectional automatically generated tracking pulses in the time coincidence circuits. These functions are provided by the circuits 65 shown in the system block diagram of FIG. 2 connecting the Vidicon tube electrical output 48 with the common input line 205 to the four coincidence circuits 66, 67, 79, and 80.

Referring now to FIG. 8 for a detailed schematic diagram of a proposed video preamplifier circuit, which is employed to raise the signal level of the Vidicon output, three tetrode vacuum tubes are provided in cascaded connection, the first two preferably type 6AK5 comprising conventionally designed high gain amplifier stages each corrected for high frequency response by means of a 5 microhenry inductor in the tube plate circuit, and the third a conventional cathode follower stage utilizing a type 6AK5 tetrode employed for impedance matching. Alternating current coupling comprising a 0.01 microfarad capacitor and 3.3M ohm resistor in series to ground interconnects the signal output of the Vidicon plate (labeled signal plate) with the first amplifier, and identical alternating current coupling interconnects each subsequent amplifier stage.

Video Amplifier, Differentiator And Inverter Circuits (FIG. 9)

The proposed video amplifier, differentiator, and invertor circuits are shown by the schematic diagram of FIG. 9 wherein the amplifier is enclosed within a dotted line designated 901 at the left of the fig., the differentiator enclosed within a dotted line 902 input coupled to the amplifier, and the inverter circuit is enclosed within a dotted line 903 coupled to the differentiator.

A signal generated by the output of video preamplifier (FIG. 8) is alternating current coupled to the video amplifier 901 comprising a pentode vacuum tube preferably type 6AU6 whose plate is energized by a 120 volt regulated source through a high frequency compensating inductor of 10 microhenries in series with a plate load of 1.5k ohms, and whose cathode is grounded through a 100 ohm feedback resistor. This single stage video amplifier operates in a manner well known to the art to provide a sufficiently large signal for subsequent application in the coincidence circuits, however it is contemplated that additional stages of straight video amplification may be added in the event additional gain is desired.

These video preamplified and amplifier pulses are thereupon conveyed by means of a 0.01 microfarad coupling capacitor and series connected 1M ohm grid leak resistor to the control grid of the single tube delay line differentiator circuit, enclosed with dotted line 902, which comprises a single pentode, preferably type 6AQ5, plate connected to a 200 volt regulated power supply through a 1,100 ohm 0.5 microsecond delay line shunted by a 1.2k ohm resistor, cathode connected to ground, and screen connected to a 120 volt regulated power supply. This tube circuit operates to generate a fixed wave form output when energized by a square wave input by means of the delaying action of the 0.5 microsecond line in parallel with the plate resistor, whereby a pulse is momentarily stored and delivered after a fixed time with proper polarity to sharply cutoff tube conduction and thus provide sharp edged pulses in response to any rapid rate of change affecting the signal input. Thus when energized by the irregularly shaped Vidicon signals, substantially constant wave form signals are generated for each rapid variation effectively differentiating the amplified Vidicon output.

Referring to the master timing chart of FIG. 3, the wave forms of the above signals are shown by the descriptively designated curves. A curve labeled TV output represents the irregular wave forms generated by the Vidicon output as the photo-conductive screen is scanned. A curve labeled TV output differentiated represents the Vidicon output after being amplified by the video preamplifier of FIG. 8 and the video amplifier 901 (FIG. 9), and being differentiated by the delay line differentiator unit 902 (FIG. 9). Although only approximately 10 fixed wave form pulses are shown by these curves, it is to be understood that these are merely selected pulses representing the edges of the target image cutting the photo-conductive screen dividing lines and that each variation of the Vidicon output is video preamplified, video amplified, and differentiated; however these additional signals are omitted from the diagram for simplifying the illustration. Assuming that the target comprises a dark object against a light background, the cathode ray beam in scanning a horizontal line from left to right across the screen, say from time $T_{160}$ until time $T_{162}$, passes from the light background to the dark target left edge, then across the dark target to its right edge subsequently passing on to the light background once again. Thus at time $T_{161}$ the magnitude of the Vidicon output curve labeled TV output rapidly drops from a higher to a lower value. Similarly as the beam passes the dark target right edge onto the light background at time $T_{162}$ the magnitude of the Vidicon signal rapidly rises from a lower to a higher value. As these signals are differentiated, the above changes appear as opposite polarity pulses (TV output differentiated), and hence it becomes desirable to rectify these pulses enabling their comparison with the unidirectional tracking pulses. Conversely, if the target comprises a light object against a dark background, the differentiated Vidicon signals representing the left and right edges of the target image appear as opposite polarity pulses 180° degrees displaced from those shown by the curve which again must be rectified to enable their time comparison with the unidirectional tracking pulses. Thus the optical pickup in the present sensing system may detect any target which distinguishes from its surrounding background, be it light or dark with equal facility.

Rectification of the above opposite polarity pulses is performed by unit 903 of FIG. 9, which employs two parallel connected pentode vacuum tubes, preferably type 6AK5, adapted to be differentially energized, and by means of a unique biasing system to provide full wave rectification. Referring now to FIG. 9, the pentode plates are commonly energized by a 120 volt regulated source through a 820 ohm resistor, and each cathode is energized by a minus 300 volt regulated source through two parallel connected resistors of 68K ohms, and grounded through the cathode plate of a diode vacuum tube preferably one half of duo-diode type 6AL5 as shown. Each differentiated Vidicon pulse from unit 902 is applied in push-pull to both control grids by means of an input transformer having a grounded center tap. In the absence of any signal applied to the pentode control grids, the large value of cathode resistance determines each tube current, and due to these large cathode resistors and the constant current characteristics of the pentode, positive signals received at the control grids have little effect in varying the value of tube plate potentials. Thus at steady state the cathode potentials are at approximately 2 volts positive and are never permitted to fall below ground potential because of the diode tubes connecting these cathodes to ground. Upon the reception of a negative pulse at either pentode control grid attempting to cut off current passage through the tube, the tube cathode potential remains substantially at ground and a positive pulse appears at the pentode plate. Thus this full wave rectifier enables the conversion of opposite polarity, uniform wave form pulses from the differentiating unit 902 into a series of unidirectional amplified pulses as shown by the curve of FIG. 3 labeled TV output differentiated and inverted.

> The remaining unit at the far right of FIG. 9 enclosed within a dotted line 904 comprises a conventional cathode follower amplifier for impedance matching, employing a pentode tube preferably type 6AK5 whose plate and screen grid are energized by a 120 volt regulated source, and whose cathode is grounded through a 470 ohm resistor. Unidirectional, differentiated, and amplified Vidicon signals are directed to the control grid across the junction of an alternating current input coupling network comprising a 0.01 microfarad condenser in series with a 1M ohm resistor to ground, and unidirection Vidicon output signals are taken from across the 470 ohm cathode follower condenser through a 0.01 microfarad coupling condenser.

Figure 10:
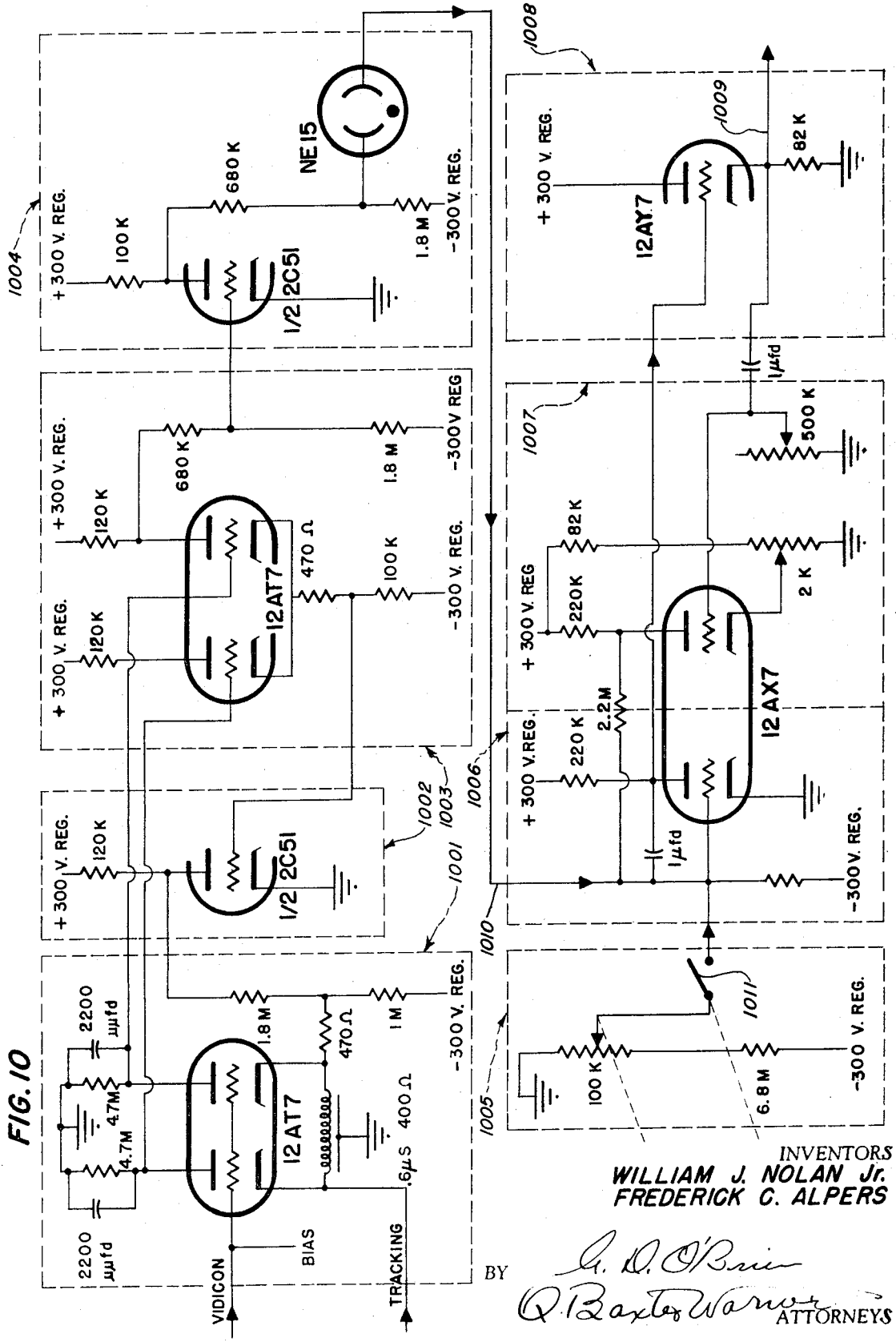
FIG. 10 is a detailed schematic diagram of a tracking coincident circuit and a tracking memory circuit.

Coincidence Circuit and Memory Circuit (FIG. 10)

The coincidence circuits in both the azimuth and elevation intelligence channels are provided to compare the time coincidence of Vidicon output signals corresponding to the four target edges with automatically generated tracking pulses corresponding thereto, and convey the coincidence errors to related memory circuits. As shown in the system block diagram of FIG. 2, four coincidence circuits are employed, two in the azimuth intelligence channel 201 labeled 66 and 67, and two in the elevation intelligence channel 202 labeled 79 and 80; the azimuth coincidence circuits 66 and 67 are responsive to the amplified, differentiated, and rectified Vidicon output signals conveyed over line 206, and the left and right edge tracking pulses passed through horizontal tracking gates 58 and 59 over lines 203 and 204 respectively, to compare the time coincidence of these related pulses; and the elevation coincidence circuits 79 and 80 are responsive to the Vidicon signal over line 206 and the top and bottom edge tracking pulses passed through vertical tracking gates 75 and 76 over lines 207 and 208 respectively to compare the time coincidence of these related pulses. In the proposed system all of these coincidence circuits are identical and accordingly the schematic diagram of one preferred embodiment is shown by FIG. 10.

Referring now to FIG. 10, the coincidence circuit is broken down into four cascaded units in horizontal array across the upper portion of the fig., each enclosed within a dotted line and consecutively numbered 1001, 1002, 1003, and 1004. Unit one (1001), comprises a two tube coincident sensing circuit employing twin triodes, preferably half of a duo-triode type 12AT7, whose plates are separately grounded through 2,200 micromicrofarad capacitors shunted by 4.7M ohm resistors, and whose cathodes are interconnected by a 0.6 microsecond 400 ohm delay line energized at its right hand terminal by a negative voltage through a 470 ohm resistor. The tracking pulse conveyed by the related tracking gate is conducted to both cathodes of the pair, directly to the left hand cathode and through the 0.6 microsecond delay line to the right hand cathode, thereby being split into two pulses separated by a 0.6 microsecond delay. Concurrently, amplified, differentiated, and inverted Vidicon output signals are conveyed to the commonly connected control grids in time phase. If the Vidicon signal at the control grids is received equidistant in time from each of the 0.6 microsecond separated pulses, or in the center of the interval between the energization of the left hand cathode and right hand cathode, both tubes are simultaneously energized by like potentials at cathode and control grid, whereby the output potentials on the plates of each tube are equal in magnitude and sign, indicating coincidence. However, should the received Vidicon signal, corresponding to the target edge be received more in time coincidence with one of the time delayed pulses energizing the cathodes than with the other, unequal plate voltages result whose relative magnitude and polarity indicate either time lead or lag of the tracking pulse over the Vidicon signal and incorrect target edge tracking pulse coincidence.

Unit three 1003 comprises a two tube difference circuit employing twin triodes, preferably halves of a duo-triode type 12AT7, each of whose plates are energized by a 300 volt regulated source through separate 120k ohm resistors, and whose cathodes are commonly connected and energized by a minus 300 volt regulated power supply through two series connected resistors of 470 ohms and 100k ohms. Plate voltages from the two tubes of the coincident sensing unit are conveyed to opposite control grids of this twin pair, and a difference signal is taken from the plate of the right hand tube through a potential divider comprising two series connected resistors of 680k ohms and 1.8M ohms to a minus 300 volt regulated source. In operation, unit three behaves in a conventional manner, the signal energizing the left hand control grid regulating the current therethrough and through the common cathode resistance, resulting in a feedback voltage to the right hand tube cathode in opposite phase to the signal energizing the right hand tube control grid, whereby the output voltage at the right hand plate is proportional to the difference of the two signals or in effect the difference of the two signals energizing the two control grids. Thus in the event the Vidicon signal is not correctly tracked the tracking pulses are out of coincidence with the Vidicon intelligence pulse and the differencing circuit generates an error signal whose magnitude and polarity indicates amount of time coincidence error and direction of coincidence error respectively.

Unit four 1004 comprises a conventional single tube D-C amplifier employing a single triode vacuum tube preferably half of duo-triode type 2C51, plate energized by a 300 volt regulate source through a 100k ohm resistor, and cathode grounded. An input signal from the potential divided output of the unit three difference circuit constituting the coincidence error is direct current coupled to energize its control grid, and an output signal comprising an amplified version of the difference or coincidence error signal is conveyed from the junction of a series resistor potential divider of 680k ohms and 1.8M ohm connecting the plate to a minus 300 volt regulate source.

Unit two (1002) comprising an error amplitude control feedback circuit, is employed to vary the magnitude of the output voltages generated by the coincidence circuit 1001 in response to a signal from the difference unit 1003, enabling the difference unit to perform independently of voltage level and deliver a true difference error signal to the succeeding circuits. This function is performed by maintaining the voltage value at the junction of the 470K and 100K ohm resistors in the cathode circuit of difference unit 1003 at a constant level by utilizing any variation in its value to control the bias voltage energizing the coincidence cathodes thereby changing the coincidence circuit plate output voltage levels in such direction to restore the cathode potential of the difference unit 1003 to its former value. Referring to FIG. 10, feedback unit 1002 employs a triode vacuum tube preferably half of duo-triode type 2C51, plate energized by a 300 volt regulated source through a 120K ohm resistor, and cathode grounded. A potential divider comprising a series connected 1.8M ohm resistor and 1M ohm resistor further connects the plate to a minus 300 volt regulated source, and the voltage existing at the junction of these resistors biases the cathodes of coincidence unit 1001 through a 470 ohm resistor. The voltage existing at the junction of the cathode resistors in the difference unit 1003 is directed to the control grid of this feedback tube, and as may now be seen controls the value of the direct current bias voltage energizing the coincidence tube 1001 cathodes in such direction to regulate this junction voltage.

Memory Circuit (FIG. 10)

The memory circuits in both intelligence channels are provided to enable the continuous automatic tracking of the target and homing guidance of the missile during momentary absences of the target reflected light image such as may be caused by weather condition and other types of short interval interference with light reception, or short interval disability of the optical sensing system by other means.

As shown in the system block diagram of FIG. 2, four memory circuits are employed, two in the azimuth intelligence channel 201 labeled 68 and 69, and two in the elevation intelligence channel labeled 81 and 82. The azimuth memory circuits 68 and 69 are responsive to the time coincidence error generated by coincidence unit 66 relating the position of the left edge of the target image and the left edge tracking pulse, and the time coincidence error generated by coincidence unit 67 relating the position of the right edge of the target image and the right edge tracking pulse respectively, to generate feedback signals, over lines 70 and 71 controlling the time at which the azimuth tracking pulses are produced; and the elevation memory circuits 81 and 82 performing similar functions in response to elevation tracking coincidence circuits 79 and 80 respectively to control the time at which the elevation tracking pulses are produced. Each of these memory units are identical and a preferred schematic embodiment of one, shown by FIG. 10, comprises four horizontally aligned units each enclosed within a dotted line designated successively from left to right 1005, 1006, 1007, and 1008.

Unit 1006, in the lower center, constitutes the basic unit of the memory circuit comprising a Miller type integrator employing a triode vacuum tube, preferably half of duo-triode type 12AX7, having its plate energized by a 300 volt regulated source through a 220K ohm resistor, its cathode grounded, and its control grid biased by a minus 300 volt regulated source through a suitable biasing resistor and connected in feedback to the plate by a one microfarad integrating condenser. Input signals energizing the control grid of this tube are stored by the action of the feedback condenser enabling an output voltage to be taken from the plate proportional to the integral of these input signals.

These integrated signals are thereupon directed from the plate of Miller integrating tube unit 1006 to the control grid of a cathode follower connected tube of unit 1008, shown at the far right of the FIG., employing a triode preferably a half of type 12AY7, plate energized directly from a 300 volt regulated source, and cathode grounded through an 82K ohm resistor. Output signals from this cathode follower amplifier, comprising the integrated signals generated by Miller integrator unit 1006 amplified by a ratio of approximately one, are thereupon directed over output line 1009 to a related tracking pulse generator (not shown), thereby controlling the time instants when this generator produces tracking pulses.

The signals energizing the input of the Miller integrator are derived from three sources, the first comprising an intermittent coincidence error signal from the output of coincidence error amplifier unit 1004 at the upper right of the FIG. over line 1010 which is conducted when the magnitude of this signal exceeds the breakdown potential of a neon tube preferably type NE15, shown in series with the output line 1010 of unit 1004; the second comprising an output signal from unit 1007; and the third an additional signal from unit 1005, located at the lower left of the FIG.

Unit 1007, interposed between Miller integrator unit 1006 and cathode follower output unit 1008 comprises a differentiating amplifier employing a triode vacuum tube, preferably half of duo-triode type 12AX7, whose plate is energized by a 300 volt regulated source through a 220K ohm resistor, and whose cathode is positively biased by the 300 volt regulated source acting through a potential divider comprising an 82K ohm resistor in series with a 2K ohm potentiometer to ground. Output signals at the cathode of output cathode follower unit 1008 are directed through a differentiating network comprising a 1 microfarad capacitor in series with a 500K ohm variable resistor to ground, and the differentiated output signal existing at the junction of this network is conducted to the control grid of differentiating amplifier unit 1007. After amplification by this tube, these differentiated output signals are fed back from the plate to the input of Miller integrator unit 1006 to constitute the second energizing signal. Thus, this unit (1007) provides in essence a feedback signal derived from the output which charges the Miller integrator with a signal proportional to the rate of change of this integrated output.

The third, or additional signal energizing the Miller integrator unit 1006, derived from unit 1005 at the far left, is taken from a resistance potential divider across a minus 300 volt regulated source to ground. This potential divider is remotely controlled manually by the operator at the initial command guidance station (25 FIG. 1) who by adjusting the value of the third signal initially controls the time of generating the tracking pulse so as to be in time coincidence with its related target edge, and thereafter opens switch 1011 enabling the coincidence and memory circuits to automatically control the time of generating pulses to track the target edges.

Summarizing the overall functions of the above-described memory units, coincidence error signals great enough to fire the neon tube (NE15 in coincidence output unit 1004), enable a voltage increment to be added to the condenser of the Miller integrator which is thereupon employed to reposition the tracking pulse or more accurately to vary its time of generation thereafter enabling it to coincide with a scanned edge of the target image. These coincidence error signals are intermittently generated whenever the tracking pulse lags behind or leads the scanned target edge image by a predetermined amount. Velocity feedback unit 1007 continuously generates signals proportional to the former rate of change of the scanned target edge image being tracked, and these signals are also applied to charge the Miller integrator input. Thus in the absence of a correcting signal from the coincidence units, such as may be caused by a momentary interruption of the received target image due to weather conditions or other interference, the Miller integrator is charged at the former rate of change and the tracking pulses are continuously repositioned at the former rate to predicted new positions, thereafter enabling the memory function of the guidance system to continue tracking the target.

Figure 11:
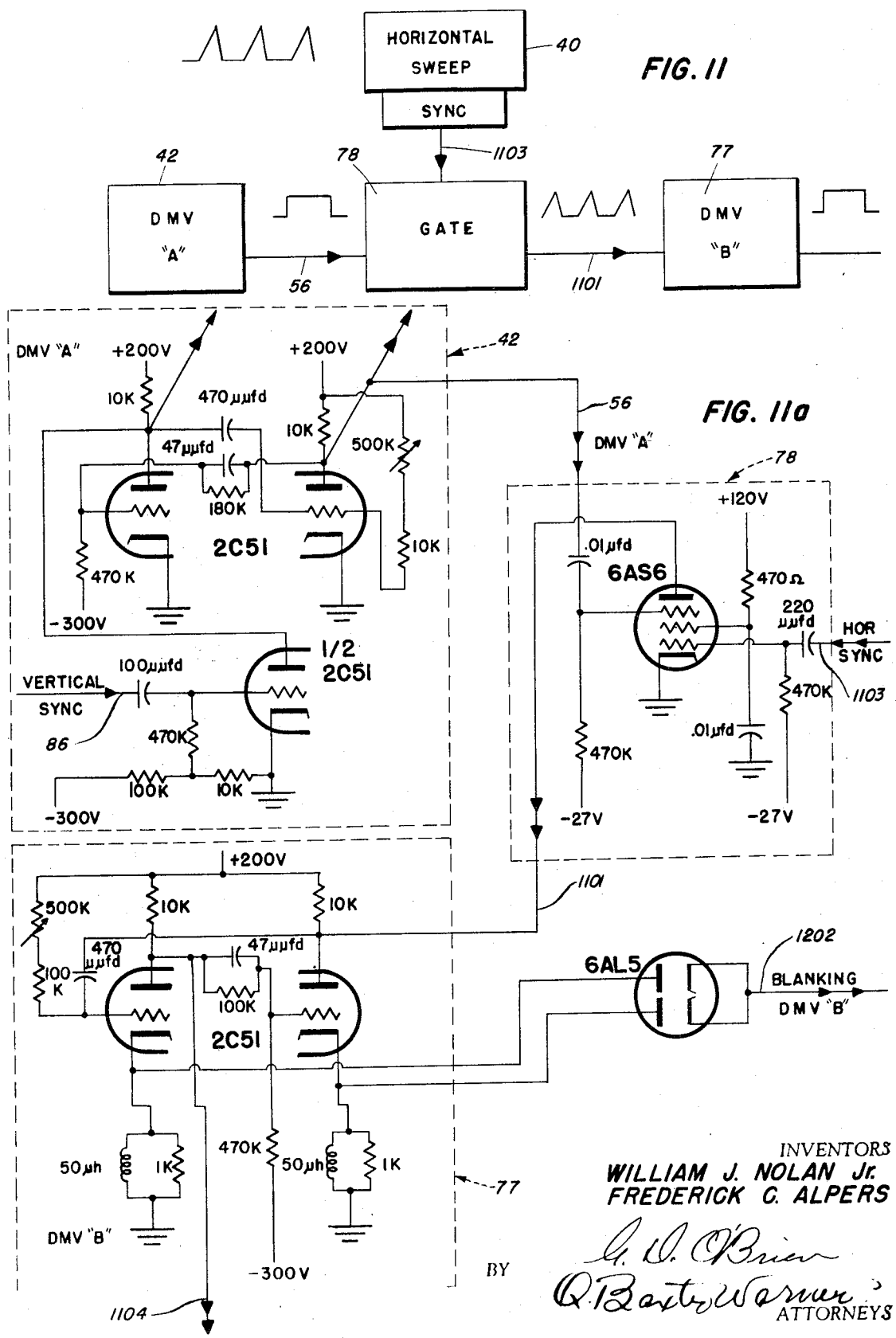
FIG. 11 is a block diagram of the circuits controlling the operation of elevation tracking gates.

Delay Multivibrator "A", Delay Multivibrator "B" and Associated Circuits (FIG. 11, FIG. 11A)

FIG. 11 is a block diagram of delay multivibrators DMV "A" 42, DMV "B" 77, and their interconnecting circuits and actuating signals, generally shown and discussed above in relation to the FIG. 2 system block diagram, but here shown on an enlarged scale to more readily enable an understanding thereof, and of the preferred circuit schematic diagram shown below by FIG. 11A. It may be recalled that DMV "B" 77 comprises a delay multivibrator circuit adapted to initially remain in its stable position and generate a fixed controlling signal to two gate circuits rendering them normally closed or inoperative to pass pulses therethrough. However upon receiving energization of a given character, delay multivibrator DMV "B" 77 is thereupon flipped over to its unstable position to generate a second value signal to the related gate circuits rendering them operatable to pass pulses therethrough. This unstable condition persists for a preselected interval determined by the values of the DMV "B" circuit components and thereafter the circuit automatically returns to its stable position and again closes the controlled gates. Thus DMV "B" is employed as a time interval controlling device operable after receiving a signal to enable the performance of a given function for a predetermined interval and then automatically to terminate this operation. The function performed is the passage of top and bottom edge tracking pulses generated in the elevation intelligence channel, for comparison in the time coincidence circuits with Vidicon output signals representing the upper and lower target edges received on the screen. Accordingly therefore, DMV "B" is energized to commence operation as the bombarding cathode ray beam is positioned to scan the top and bottom edges of the received target image which as may be seen by reference to FIG. 1C occurs during the second scanning pattern of each cycle as the beam scans transversely to the target image edges 32 and 33.

Referring now to the enlarged block diagram FIG. 11, DMV "B" designated 77 is at the far right, DMV "A" 42 at the left, the horizontal saw-tooth sweep generator 40 at the upper center, and a two signal responsive gate circuit 78 interconnecting DMV "A" 42 and horizontal sweep 40 with DMV "B" at the center.

Upon the initiation of the vertical saw-tooth generated wave "flyback" time a vertical sync pulse is generated over line 86 (FIG. 2) which is adapted to render delay multivibrator DMV "A" unstable, and enable it to generate a positive pulse over output line 56. This positive pulse conditions scanning gate 44 (FIG. 2) to commence the second scanning pattern as shown by FIG. 1C and further conditions the DMV "B" controlling gate 78. Once gate 78 is conditioned, the next horizontal sync pulse, generated at the initiation of the horizontal "flyback" over line 1103, passes through to output line 1101 and flips DMV "B" to its unstable position thereby initiating the operation of DMV "B".

The time sequence of the above events may be clearly seen by reference to the wave form timing diagram FIG. 3 where the curve labeled DMV "A" illustrates that at time $T_{321}$ gate 78 receives a positive enabling pulse from DMV "A" signifying the commencement of the second scanning pattern, and the curve labeled horizontal sync illustrates that at time $T_{322}$ a horizontal sync pulse is generated to pass through now opened gate 78 and trigger DMV "B" to its unstable position.

The detailed schematic diagram FIG. 11A shown below FIG. 11 comprises the preferred circuitry for performing the above-mentioned functions, each of these circuits enclosed within a dotted line numbered to correspond with the similarly designated block.

DMV "A" enclosed within dotted line 42 at the upper left comprises a conventionally designed delay multivibrator circuit employing two triode vacuum tubes preferably halves of duo-triode type 2C51 having plate control grid feedback interconnecting both tubes. The left hand tube is plate energized by a 200 volt regulated source through a 10K ohm resistor, cathode grounded, and control grid energized by a minus 300 volt regulated power supply through a 470K ohm resistor; and the right hand tube is plate energized by a 200 volt regulated power supply through a 10K ohm resistor, cathode grounded, and control grid energized by a 200 volt regulated source through series connected variable 500K ohm and fixed 10K ohm resistor. A 470 micromicrofarad feedback capacitor interconnects the left hand plate and right hand control grid, and a feedback network, comprising a 47 micromicrofarad condenser shunted by a 180K ohm resistor, interconnects the right hand plate with the left hand control grid. Under steady state conditions the right hand tube is conducting due to the positive control grid potential supplied by the 200 volt regulated source through the series connected resistors, while conversely the left hand tube is "cutoff" because of the more negative control grid potential supplied by the feedback potential and the minus 300 volt bias source. However, upon the application of a negative pulse to the control grid of the right hand tube through the 470 micromicrofarad feedback condenser, the conducting condition of these tubes are reversed enabling the left hand tube to conduct and the right hand tube to cutoff, thereby providing a positive pulse at the right hand tube plate and on output line 56. This negative flipping pulse is supplied by the triode shown below the delay multivibrator and connected in shunt with the left hand tube, which in response to a positive pulse from the vertical sync over line 86 to its control grid is adapted to momentarily pass current and lower its plate voltage. Thus in response to a positive vertical sync pulse, DMV "A" is adapted to reverse the stable conducting condition of its two tubes and generate a positive output pulse on line 56.

The two signal responsive gate enclosed within dotted line 78 at the right center of the FIG., employs a pentode vacuum tube preferably type 6AS6 whose suppressor grid is energized by the DMV "A" signal over line 56 through a 0.01 microfarad coupling condenser, and biased by a minus 27 volt regulated source through a 470K ohm resistor, and whose control grid is biased by a minus 27 volt regulated supply and energized by the horizontal sweep sync signal over line 1103 through a 220 micromicrofarad coupling capacitor. Normally these minus bias voltages energizing the suppressor and control grids prevent conduction of current through the tube, however upon the synchronous reception of positive signals at these grids from DMV "A" line 56 and horizontal sweep sync line 1103, conduction of current through the gate is commenced, providing a negative pulse at the plate and over line 1101 sufficient to flip over DMV "B" to its unstable position.

DMV "B" shown enclosed by a dotted line 77 at the lower left of the FIG., comprises a conventionally designed delay multivibrator circuit similar to that of DMV "A" 42 shown above, but differing in the value of components controlling the instability period (feedback time constants). Two parallel networks each comprising a 50 microhenry coil shunted by a 1K ohm resistance are placed one in the cathode to ground circuit of each DMV "B" tube, enabling sharp edged pulses to be generated upon the conduction of current through these tubes. These sharp edged pulses are conveyed through the duo-diode 6AL5 as shown, and are employed to perform blanking functions more fully shown and described in connection with the blanking circuits of FIG. 12. Output signals are conducted over line 1104 connected to the plate of the DMV "B" left hand tube, and these signals as may be seen by reference to the system block diagram of FIG. 2 are employed to control the operation of top and bottom edge tracking gates 75 and 76.

Figure 12:
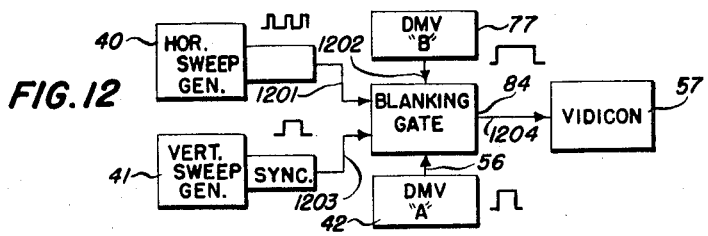
FIG. 12 is a block diagram of blanking circuits employed by the present system.
Figure 12A:
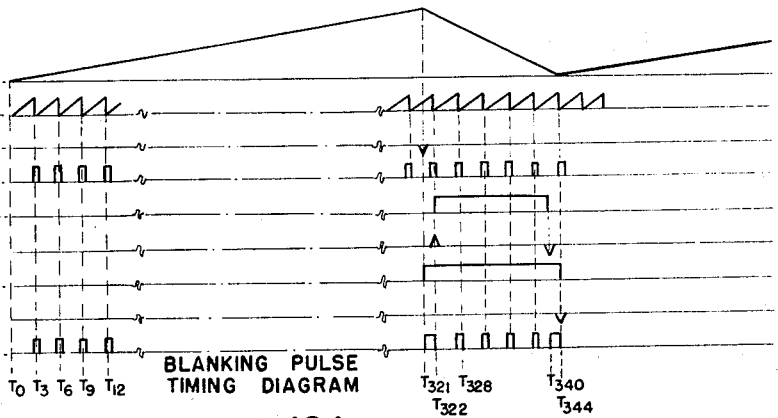
FIG. 12A is a timing diagram showing the time relation of electrical waveforms generated by the circuits of FIG. 12.
Figure 12B:
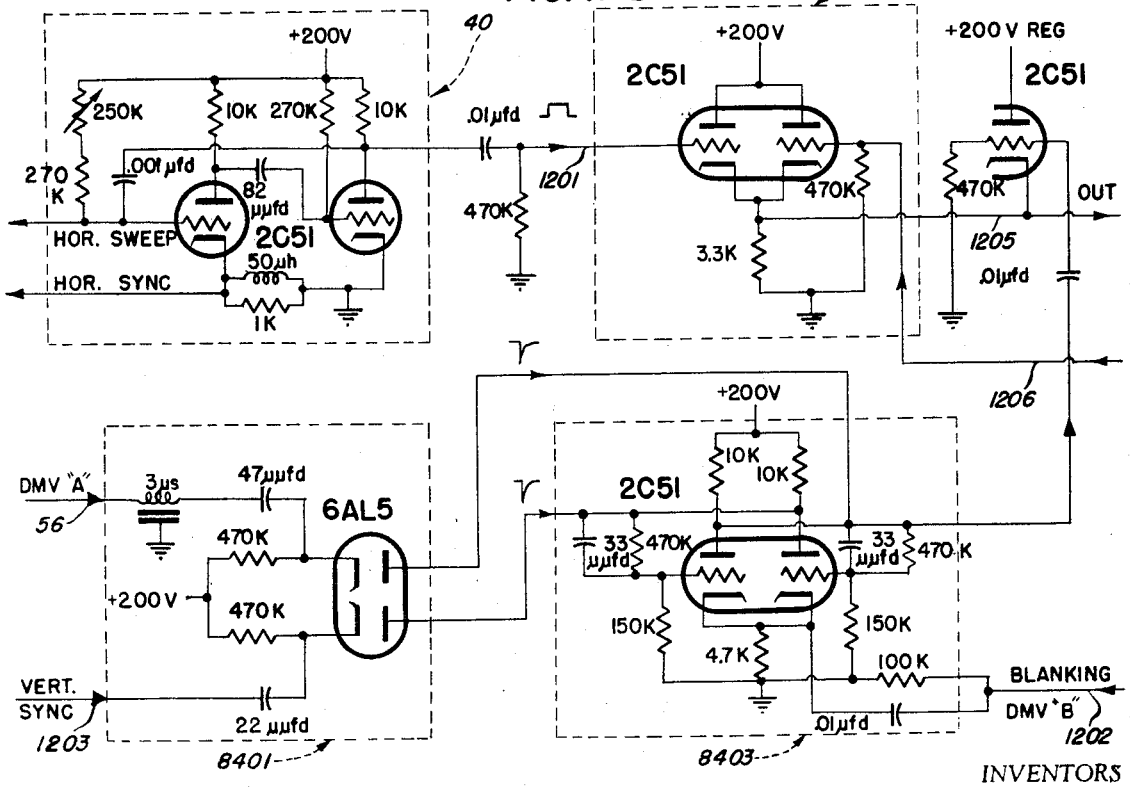
FIG. 12B is a detailed schematic diagram of the circuits of FIG. 12.

Blanking (FIGS. 12, 12A, and 12B)

In the process of converting the target light image to a series of electrical signals, the cathode ray beam scanning the Vidicon photo-conductive screen momentarily erases the light image as it passes thereacross. Accordingly, during the course of both scanning patterns of each cycle, it is desired to prevent the cathode ray beam from erasing the screen during periods of time when light information is not being electrically converted. For example, in the first scanning pattern, shown by FIG. 1B, the target information is being derived only during the forward going portion of the horizontal scan lines shown (designated 361), while during the flyback time the beam is merely rapidly returned to the left edge of the screen for instituting a new horizontal scan line. Similarly, during the second scanning pattern of each cycle, illustrated by FIG. 1C, conversion of the received image at the screen center is derived solely during the positive going portion of the sweep lines or during the top to bottom scanning (shown by dotted lines 364), while the solid line 365 comprises the rapid repositioning of the beam for instituting a new scanning line. Additionally, it is desired to prevent erasure of the screen during repositioning periods, such as occur at the close of the horizontal line scanning raster (pattern 1) of FIG. 1B and the initiation of the vertical line raster (pattern 2) of FIG. 1C, and at the close of the vertical line raster and the initiation of a new cycle. This erasure prevention, termed by the television art as blanking, comprises the application of pulses to the control grid of the cathode ray type tube to thereby prevent the passage of electrons from the generating gun to the screen face.

FIG. 12 is a block diagram of the proposed circuits for generating these desired blanking pulses during each cycle, and beneath FIG. 12 is a timing diagram FIG. 12A for illustrating the time sequence of these generated blanking pulses.

Referring now to FIG. 12, a blanking gate 84 in the center of the FIG. opens and closes upon proper energization to permit blanking pulse passage over output line 1204 to the Vidicon control grid. This gate responds to four separate input signals over lines 1202, 1201, 1203, and 56, which are generated by delay multivibrator DMV "B" 77, horizontal sweep generator 40, vertical sweep generator 41, and delay multivibrator DMV "A" 42 respectively. For the manner in which these four input signals cooperate with blanking gate 84 to provide blanking pulses of proper phase, duration, and sequence enabling the Vidicon cathode ray scanning beam to cut off at the desired times, reference is now made to the timing diagram FIG. 12A. In FIG. 12A the electrical wave forms generated by the vertical sweep generator, the horizontal sweep generator, and the two delay multivibrators DMV "B", and DMV "A" are again reproduced in connection with the electrical signals resulting from the application of these wave forms to the blanking gate 84 over a time period of one cycle. The first wave form is that of the vertical sweep generator 41 shown as a positive increasing saw-tooth from times $T_0$ through time $T_{321}$, and negative going from time $T_{321}$ to time $T_{344}$. The second wave form, directly below and comprising a plurality of high frequency saw-tooth waves represents the horizontal sweep signal produced by generator 40. Directly below these two wave forms, the following two signals labeled vertical sync and horizontal "flyback" represent the signals generated over lines 1203 and 1201 respectively to the blanking gate 84 and which comprise a single negative pulse occurring at time $T_{321}$ generated upon the initiation of the vertical "flyback", and a series of positive pulses taken from the horizontal sweep upon the initiation of each horizontal "flyback" respectively. Two succeeding curves labeled DMV "B" and DM V "A" comprise the remaining two signals directed to the blanking gate 84 over lines 1202 and 56 respectively, both of which are generated during the "flyback" time of the vertical sweep generator between times $T_{321}$ and $T_{344}$.

During both scanning patterns (FIG. 1B and 1C) the horizontal generator positions the Vidicon beam to sweep the screen face, however, upon completion of each scan line the negative going portion of the horizontal saw-tooth wave directs the beam to "-flyback" to its initial position. Simultaneously with each line "flyback", the horizontal generator directs a horizontal "flyback" signal over line 1201 to the blanking gate 84 which thereupon opens to pass a blanking pulse to the Vidicon grid thus preventing erasure of the screen during these intervals. Upon completion of the first scanning pattern (FIG. 1B) at time $T_{321}$, it is desired to blank the tube for a sufficient period during which the scanning beam may be repositioned to commence the vertical scan lines of the second scanning pattern (FIG. 1C). This occurs during each cycle at time $T_{321}$, and at this time a negative vertical sync pulse is directed over line 1203 conditioning blanking gate 84 to cut off the Vidicon beam. This latter signal leaves blanking gate open, thereafter preventing the Vidicon beam from reaching the screen until commencement of the second scanning pattern. Upon the commencement of this second scanning pattern delay multivibrator DMV "B" is flipped to its unstable position generating a positive pulse at time $T_{322}$ (as shown by the wave form below DMV "B") over line 1202 which thereafter closes blanking gate 84 permitting the Vidicon beam to again scan the screen. Subsequently blanking pulses are applied during the second scanning pattern for each scan line "flyback" by the horizontal "flyback" signals over line 1201 until time $T_{340}$. At time $T_{340}$ the second scanning pattern is ended by the automatic return of DMV "B" to its stable state, whereupon a negative pulse is generated over line 1202 to pen blanking gate 84 and cut off the Vidicon beam. Again this blanking gate remains open cutting off the Vidicon beam until the beginning of a new cycle, and during this blanked out interval from time $T_{340}$ to $T_{344}$ the scanning beam is repositioned to commence the horizontal scan lines of pattern one. At time $T_{344}$ the second cycle begins and the automatic return of delay multivibrator DMV "A" to its stable state directs a negative pulse over line 56 (shown by the wave form directly beneath curve labeled DMV "A") which thereupon closes blanking gate 84 to again restore the Vidicon scanning beam.

The lowest curve of FIG. 12A labeled blanking, illustrates the time sequence of all the blanking pulses or in effect the signals on blanking gate output line 1204. Thus during the first scanning pattern of each cycle, the Vidicon beam is cut off at times $T_3$, $T_6$, $T_9$, $T_{12}$, etc. simultaneously with each horizontal scan "flyback". At the end of the first scanning pattern (time $T_{321}$) the beam is again cut off and remains cut off until time $T_{322}$ during which interval the beam is repositioned to commence the top to bottom scanning of the screen. When the beam has been repositioned at time $T_{322}$, the blanking is removed allowing the second pattern scanning to commence. During the second pattern scanning, the Vidicon beam is again cut off for each vertical "-flyback" at times $T_{328}$ ... etc. Finally, at the close of the second scanning pattern (time $T_{340}$) the beam is again cut off and remains cut off until time $T_{344}$ during which interval the beam is repositioned to begin the first scanning pattern of a new cycle.

Referring now to FIG. 12B for a schematic diagram of the preferred circuitry for performing the above-mentioned functions, the horizontal sweep generator circuit is shown at the upper left enclosed within a dotted line 40, the blanking gate 84 of FIG. 12 is divided into three independently operating units enclosed within dotted lines 8401, 8402 and 8403, and the remaining energizing signals from delay multivibrator DMV "A", delay multivibrator DMV "B", and vertical sweep generator sync are shown by input lines designated 56, 1202, and 1203 respectively corresponding to the similar numbered energizing lines of FIG. 12 and the overall system block diagram FIG. 2. The horizontal sweep generator 40 comprises a two tube unsymmetrical multivibrator employing two triodes, preferably halves of a duo-triode type 2C51, each having a control grid AC coupled to the plate of the other through a suitable capacitor. Plate energization of both tubes is from a 200 volt regulated source through separate 10K ohm resistors, and the cathode of each is grounded; the right cathode directly to ground and the left cathode through a parallel inductor resistor network of 50 microhenrys and 1K ohms. Unsymmetrical operation of this multivibrator is achieved by means of coupling the left-hand plate to the right-hand control grid through an 82 micromicrofarad condenser whose right side is biased by a 200 volt regulated source through a 270K ohm resistor, while a 0.001 microfarad condenser couples the right-hand plate to the left-hand control grid. Square wave output voltages are taken from the plates of both tubes, however, a saw-tooth wave constituting the horizontal sweep signal is derived from the left-hand control grid further biased to vary linearly from the 200 volt regulated source through a series connection of variable 250K ohm resistor and 270K ohm resistor. The network connecting the left-hand cathode to ground functions as a wave shaper enabling horizontal sync pulses to be derived from this junction. An alternating current coupling network comprising a 0.01 microfarad condenser in series with a 470K ohm resistor is interposed between the right hand plate and ground enabling a square wave "-flyback" pulse to be generated at the network junction to succeeding upper gate unit 8402.

Upper gating unit 8402 comprises a duo-triode, preferably type 2C51, operating as a cathode follower type switch having both plates commonly energized directly from a 200 volt regulated source and both cathodes commonly grounded through a 3.3K ohm resistor, the left hand control grid energized from the "-flyback" signal of horizontal sweep generator 40 and the right hand control grid biased to ground by a 470K ohm grid leak resistor and energized by a signal over line 1206. An additional triode preferably one half of duo-triode 2C51 at the far upper right of the FIGURE is connected in parallel with the two tube cathode follower type switch, that is, its cathode is connected to the common junction of the switch tube cathodes and its plate is directly energized by a 200 volt regulated source. A 470K ohm resistor connects the additional triode control grid to ground and a blanking signal is conducted to this control grid through a 0.01 microfarad coupling condenser. Because of the common cathode connection of these three tubes to the 3.3K ohm cathode resistor a positive going signal energizing any of the three tube control grids enables a positive pulse to appear across this common 3.3K ohm cathode resistor thereby permitting all three tubes to function as an output switch in response to any of three signals.

Blanking gate unit two enclosed within a dotted line designated 8401 at the lower left of the FIG. comprises a unidirectional isolating switch employing duo-diodes preferably type 6AL5 whose cathodes are energized by a 200 volt regulated source through separate 470K ohm resistors and whose plates are separately connected to opposite plates of the following blanking gate unit three designated 8403. A signal from delay multivibrator "A" is introduced over line 56 through a series connected 3 microsecond delay line and 47 micromicrofarad capacitor to the upper isolating diode cathode, and the vertical sync signal is introduced over line 1203 through a 22 micromicrofarad capacitor to the cathode of the lower isolating diode. Because of the unidirectional characteristics of this duo-diode, separate negative pulses may be passed from cathode to plate through either section without interference however no signal may be passed back to delay multivibrator line 56 or vertical sync line 1203.

The third unit of blanking gate 84, shown enclosed within a dotted line 8403 at the lower right, comprises a conventional double stability flip-flop circuit employing duo-triodes preferably duo halves of type 2C51. This circuit is conventionally designed, comprising symmetrical elements interconnected in stable feedback between both tubes as shown. A negative pulse injected in the plate circuit of either tube operates to render the opposite tube nonconducting, while a negative pulse to the common cathode connection merely flips the conducting condition before pulse reception to opposite conducting condition. Thus a negative pulse from the upper diode conducted to the left hand plate operates to render the right hand tube nonconducting and left tube conducting, a negative pulse to the right hand plate from the lower diode of unit 8401 operates to render the left hand tube nonconducting and the right hand tube conducting, and a negative pulse injected at the common cathode connection operates to flip over the then conducting condition of the tubes to the opposite state indiscriminately. DMV "B" pulse over line 1202 causes a voltage drop to ground across a high value 100K ohm resistor, while being conducted to the common cathode connection of gate unit 8403 through a coupling capacitor of 0.01 microfarad thereby indiscrimately changing the conducting condition of the tubes.

Now taking the FIG. 12B circuit in connection with the FIG. 12A timing diagram to enable a clearer operational description thereof, pulses from the horizontal sweep of the multivibrator 40 are continuously generated over line 1201 to the left hand control grid of the blanking gate unit one 8402 during each "flyback" of the horizontal sweep generator, thereby enabling a series of blanking pulses to be generated over output line 1205 to the Vidicon, as shown by the FIG. 12A timing diagram curve labeled blanking. These pulses are continuously generated throughout the first scanning pattern taking place from time $T_0$ to time $T_{321}$. Upon the commencement of the vertical sweep generator "flyback", a vertical sync pulse is generated over line 1203, conducted through the 22 microfarad coupling capacitor, and cathode to plate of the lower isolating diode to the right hand plate of blanking gate unit 8403 thereby cutting off conduction of the left hand tube. Nonconducting condition of this tube (left hand) enables the generation of a positive pulse to the control grid of the upper right triode in unit 8402 causing conducting therethrough and a positive output pulse to the Vidicon blanking grid. Unit 8403 then remains in this stability position until time $T_{322}$. At time $T_{322}$ delay multivibrator "B" is triggered, as may be seen from the FIG. 12A curve labeled DMV "B", injecting a negative pulse to the common connected cathodes of the unit 8403 to reverse the conducting condition of these tubes and remove the positive pulse from the control grid of the upper right hand triode of unit 8402. Thereafter the vertical line scanning of the Vidicon takes place from time $T_{322}$ until time $T_{340}$ interrupted only by the vertical line flyback blanking provided by horizontal sweep generator 40 over line 1201. However at time $T_{340}$ the vertical scanning of the Vidicon tube is completed and DMV "B" automatically returns to its stable position thereby again reversing the conducting condition of the blanking gate unit 8403 to blank the Vidicon once again. During this blanking period the cathode ray beam is thereupon repositioned to commence the first scanning pattern of the second cycle and repeat the horizontal scanning line raster. The commencement of this operation is indicated by the automatic return of delay multivibrator "A" to its stable state thereby generating a negative pulse to unit 8401 over line 56 through the 3 microsecond delay line, 47 micromicrofarad capacitor, and cathode-plate of the upper isolating diode to the left hand plate of stable trigger 8403 to reverse trigger 8403 to its left hand tube conducting condition and restoring the blanking pulse to zero.

Thus the Vidicon cathode ray beam is cutoff during each scanning line "flyback", during the interval between the cessation of the first scanning pattern and the initiation of the second scanning pattern, and the interval between the cessation of the second scanning pattern and the institution of a new scanning cycle.

It has been found to be further desirable to blank out the cathode ray bombarding beam during the first scanning pattern as it momentarily passes the screen bisecting vertical line 30 during each horizontal scan thereby preventing the erasure of the top and bottom target edge images. To provide this additional blanking function, a separate signal is introduced to the control grid of the second tube of unit 8402 over line 1206 during each horizontal scan as the beam passes the vertical center line. A diode pickoff blocking oscillator circuit, similar to that employed in the tracking gate circuits illustrated by FIG. 6 constitutes the preferred means of controlling the time generation of these latter pulses thereby enabling additional blanking of the cathode ray beam at these times.

Obviously many modifications and variations of the present invention are possible in the light of the above teachings. It is therefore to be understood that within the scope of the appended claims the invention may be practiced otherwise than as specifically described.

What is claimed is:

1. In a discriminatory guidance system for self-directing an aircraft to home on a selected target disposed within a group of similar targets, a screen for receiving the target image, a first and second cyclically operating generating means cooperatively performing to convert the received screen image into a series of sequential electrical image signals, pulse producing means actuated by the first generating means for providing a tracking pulse at a given time during selected cycles of the first generating means, gating means responsive to the pulse producing means and jointly controlled by both generating means to allow tracking pulse passage during a given portion of the second generated cycle, and coincident measuring means energized by the electrical image signals and the gated tracking pulses to provide error signals proportional thereto, said error signals fed back to the pulse producing means for controlling the time during the cycle of the first generating means at which the tracking pulse is generated.

2. Apparatus for electrically tracking the variable position of a received light image whose outer edge cuts a fixed line on the light sensitive screen of a television type pickup tube comprising: generating means for cyclically scanning the screen with a plurality of lines parallel to the fixed line and adjacent thereto, trigger means actuated by the generating means and responsive to a feedback signal for providing a tracking pulse during each scan line whose position is controlled by the value of this feedback signal, time coincidence comparing means energized by both the tracking pulses and the pickup tube output to generate an error signal, and memory means responsive to this error signal for modifying the feedback signal enabling the tracking pulse position to follow the received image edge.

3. In a discriminatory guidance system for self-directing an aircraft to home on a selected target disposed within a group of similar targets, a screen for receiving the target image, a first and second cyclically operating generating means cooperatively performing at different frequencies to convert the screen image to a series of sequential electrical signals, pulse producing means associated with the first generating means for providing pulses at a given time during each cycle of the first generating means, gating means responsive to the pulse producing means and jointly controlled by both generating means to provide tracking pulses during a given portion of each second generated cycle, and comparing means for measuring the time coincidence between the tracking pulses and preselected electrical signals and providing a feedback signal to the pulse producing means for varying the time at which pulses are produced during each cycle, thereby enabling the tracking pulses to coincide in time with given electrical signals.

4. A discriminatory guidance system for directing an aircraft on a homing pursuit path to a selected target comprising a light responsive screen to receive reflected light from the target and from the surrounding media, converting means for sequentially generating electrical signals corresponding to the light energy received by given adjoining incremental areas on the screen, means for differentiating these electrical signals to determine rapid changes of light energy received by adjacent screen areas, inverting means responsive to said differentiated means to provide a series of unidirectional pulses corresponding to said rapid light changes, and an intelligence unit comprising means to automatically track the positions that target edge images cut the screen at a bisecting position, said intelligence unit being energized by said unidirectional pulses to perform time comparison of the tracking pulses and the unidirectional pulses to generate control signals for enabling the aircraft to home by pursuit navigation on this target, the differentiated signals enabling the system to distinguish the target irrespective of the relative amount of light received from the target and background media.

5. Apparatus for electrically tracking the variable position of a light image received on the screen of a Vidicon tube, comprising generating means for scanning the screen with a plurality of lines in regularly occurring sequence, trigger means responsive to the generating means and responsive to a feedback signal for providing a tracking pulse during each scan line whose position is controlled by the value of this feedback signal, time coincidence means energized by both the tracking pulses and Vidicon signals representing electrically converted scanned image edges to generate an error signal, and memory means responsive to this error signal for modifying the feedback signal enabling the tracking pulse position to follow the received image edge, said feedback signal representative of the screen position of one edge of the received light image.

6. A discriminatory guidance system for directing an aircraft to home on a given object disposed within a group of similar objects comprising a photo-electric sensing means including a light sensitive screen to receive a target image, elevation follow-up means for continuously tracking the two positions on the screen bisecting vertical line being cut by the upper and lower outside edges of the received object image, azimuth follow-up means for continuously tracking the two positions on the screen bisecting horizontal line being cut by left and right outside edges of the object image, memory means in each follow-up means enabling approximate tracking of the target edge image positions should the sensed image be interrupted by employment of the prior rate of change of the target edge image position, and comparing means associated with each follow-up means for computing inequality of opposite tracked target edge image position from the screen center and adapted to generate error signals, the error signals thereby providing azimuth and elevation guidance for directing the aircraft on a homing course to the target.

7. In a discriminatory guidance system for self-directing a missile to home on a selected complex target, a photo-electric screen to receive the target image, a plurality of means for tracking each continually changing position of the target image outside edges cutting the horizontal and vertical screen bisecting lines, each tracking means including a unit for generating a measurable signal corresponding to a predicted position upon the screen of one target image outside edge, and including a comparing unit and a memory unit, the comparing unit operable in response to the measurable signal and the photo-electrical screen to unbalance should the measurable signal vary from actual received image edge position, and the memory unit adapted to continue the unbalance in accordance with the prior unbalance rate of change should the light image be interrupted, said unbalance fed back to control the generating unit thereby enabling the measurable signal to continuously follow the varying image edge screen position.

8. A discriminatory homing guidance system for an aircraft comprising a target image detecting screen, an azimuth control unit responsive to the horizontal position of the received target image on the screen to unbalance when the aircraft is heading off-target in azimuth, an elevation position control unit responsive to the vertical position of the received target image to unbalance when the aircraft is heading off-target in elevation, memory means comprising a first velocity feedback unit to continuously generate signals proportional to the prior rate of change of the target image being tracked and a first integrator responsive to said velocity feedback unit and chargeable at the prior rate of change in the absence of correcting signals from the azimuth control unit, said memory means being thereby adapted to continue the azimuth unbalance in accordance with the prior unbalance rate of change when the target light image is interrupted, and memory means comprising a second velocity feedback unit to continuously generate signals proportional to the prior rate of change of the target image being tracked and a second integrator responsive to said second velocity feedback unit and chargeable at the prior rate of change in the absence of correcting signals from the elevation control unit, said last-named memory means being thereby adapted to continue the elevation unbalance in accordance with the prior unbalance rate of change when the target light image is interrupted.

9. An automatically operating guidance system for an aircraft comprising a television camera tube to receive a target image, generating means for cyclically scanning the tube to convert the image to sequentially generated video signals, first time control means interposed between the tube and generating means responsive to preselected values of the generating means for dividing each scan cycle into a plurality of distinct scanning patterns, an azimuth intelligence channel, a second time control means associated therewith, the second time control means jointly responsive to the first time control means and generating means to open the azimuth intelligence channel for a time interval during one of said scanning patterns, the azimuth intelligence channel responsive to the generating means and the video signals for determining the correct azimuth heading toward the target during the opened interval, an elevation intelligence channel, a third time control means associated therewith, the third time control means jointly responsive to the first time control means and generating means to open the elevation intelligence channel for a time interval during a second of said distinct scanning patterns, the elevation intelligence channel responsive to the generating means and the video signals for determining the correct elevation heading toward the target during this second opened interval.

10. Apparatus for continuously tracking the variable position of a point on the light sensitive screen of a television camera tube having an electrical output, which point is equidistant from opposite edges of a received light image cutting a fixed line on the screen face comprising: means for sequentially scanning the screen face with a plurality of lines parallel to the fixed line and adjacent thereto, first trigger means responsive to the scanning means and responsive to a first feedback signal for providing a tracking pulse during each scan line whose position is controlled by the value of this feedback signal, second trigger means responsive to the scanning means and responsive to a second feedback signal for providing a tracking pulse during each scan line whose position is controlled by the value of the second feedback signal, first and second measuring means each responsive to the related tracking means and the camera tube electrical output to compare the tracking pulses with selected tube signals representing the opposite target edge images and generate said first and second feedback signals in accordance therewith, and a first output means additionally responsive to both first and second feedback signals to determine their average value, said average value proportional to the desired point.

11. Apparatus for continuously determining the position of a point on the light sensitive screen of a cathode ray type optico-electrical converting tube having an electrical output, which point is equidistant from two opposite pairs of outside edges of a received light image cutting two fixed intersecting lines on the screen face comprising: means for sequentially scanning the screen face with a plurality of lines parallel to one fixed line and adjacent thereto during a given interval in response to a cyclically generated first initiating signal, first and second tracking means responsive to the scanning means during this interval to continuously predict the screen positions of two opposite image edges cutting this first fixed line in response to first and second feedback signals respectively, first and second computing means responsive to related tracking means and the tube output to compare the predicted position of each edge with the scanned position and generate said first and second feedback signals in accordance therewith, and a first output means additionally responsive to both first and second feedback signals to determine their average value; means for sequentially scanning the screen face with a plurality of lines parallel to the second fixed line and adjacent thereto during a second fixed interval in response to a cyclically occurring second initiating signal generated at the termination of the first interval, third and fourth tracking means responsive to the scanning means during this second interval to continuously predict the screen position of two opposite image edges cutting this second fixed line in response to third and fourth feedback signals respectively, third and fourth computing means responsive to the related tracking means and the tube output to compare the predicted positions of each edge with the scanned position and generates said third and fourth feedback signals in accordance therewith, and a second output means additionally responsive to both third and fourth feedback signals to determine their average value, whereby the two derived average values determine the desired screen position.

12. Apparatus for electrically tracking the variable position of a light image received on the screen of a Vidicon tube by continuously determining the distances of the light image edges from a given position on the screen comprising means for scanning the screen with a plurality of lines passing through the given screen position and cutting the edges of the received light image, a plurality of tracking generators each responsive to the scanning means for producing a tracking pulse during each scan line whose position is controlled by the value of a separate feedback voltage, a plurality of time coincidence circuits each responsive to one of the tracking generators and the Vidicon tube output to provide correction signals, a plurality of memory means each responsive to one time coincidence circuit for generating one of said separate feedback voltages, and a plurality of comparing means each responsive to a different pair of said memory means for determining the average value of two feedback voltages, said average values indicative of the instantaneous position of the light image on the Vidicon screen.

* * * * *